United States Patent
Koike et al.

(10) Patent No.: US 8,379,772 B2
(45) Date of Patent: Feb. 19, 2013

(54) RECEIVER, COMMUNICATION SYSTEM, AND CHANNEL ESTIMATION METHOD

(75) Inventors: Chimato Koike, Kawasaki (JP); Daisuke Ogawa, Kawasaki (JP); Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 12/893,070

(22) Filed: Sep. 29, 2010

(65) Prior Publication Data
US 2011/0075743 A1 Mar. 31, 2011

(30) Foreign Application Priority Data
Sep. 30, 2009 (JP) .................................. 2009-228843

(51) Int. Cl.
*H04L 27/06* (2006.01)
(52) U.S. Cl. ..... 375/340; 375/347; 370/252; 455/67.11; 455/226.1
(58) Field of Classification Search .................. 375/141, 375/147, 260, 267, 340, 346, 347; 370/252; 455/67.11, 226.1, 226.2, 226.3, 226.4
See application file for complete search history.

(56) References Cited

U.S. PATENT DOCUMENTS
| | | | |
|---|---|---|---|
| 8,165,229 B2 * | 4/2012 | Paik et al. ..................... | 375/260 |
| 2008/0273583 A1 * | 11/2008 | Song et al. ..................... | 375/224 |
| 2010/0098009 A1 | 4/2010 | Higuchi | |

FOREIGN PATENT DOCUMENTS
JP 2008-236428 A 10/2008

* cited by examiner

*Primary Examiner* — Dac Ha
(74) *Attorney, Agent, or Firm* — Fujitsu Patent Center

(57) ABSTRACT

A receiver includes a channel estimation unit that calculates channel estimation values of symbols containing pilot signals from signals transmitted by a plurality of antennas to obtain channel estimation values of symbols in the same positions of the antennas, a de-precoding unit that de-precodes the channel estimation values of the antennas calculated by the channel estimation unit to calculate effective channel estimation values, and a time-direction interpolation unit that performs time-direction interpolation using the effective channel estimation values calculated by the de-precoding unit to calculate effective channel estimation values of symbols other than the symbols containing pilot signals.

15 Claims, 10 Drawing Sheets

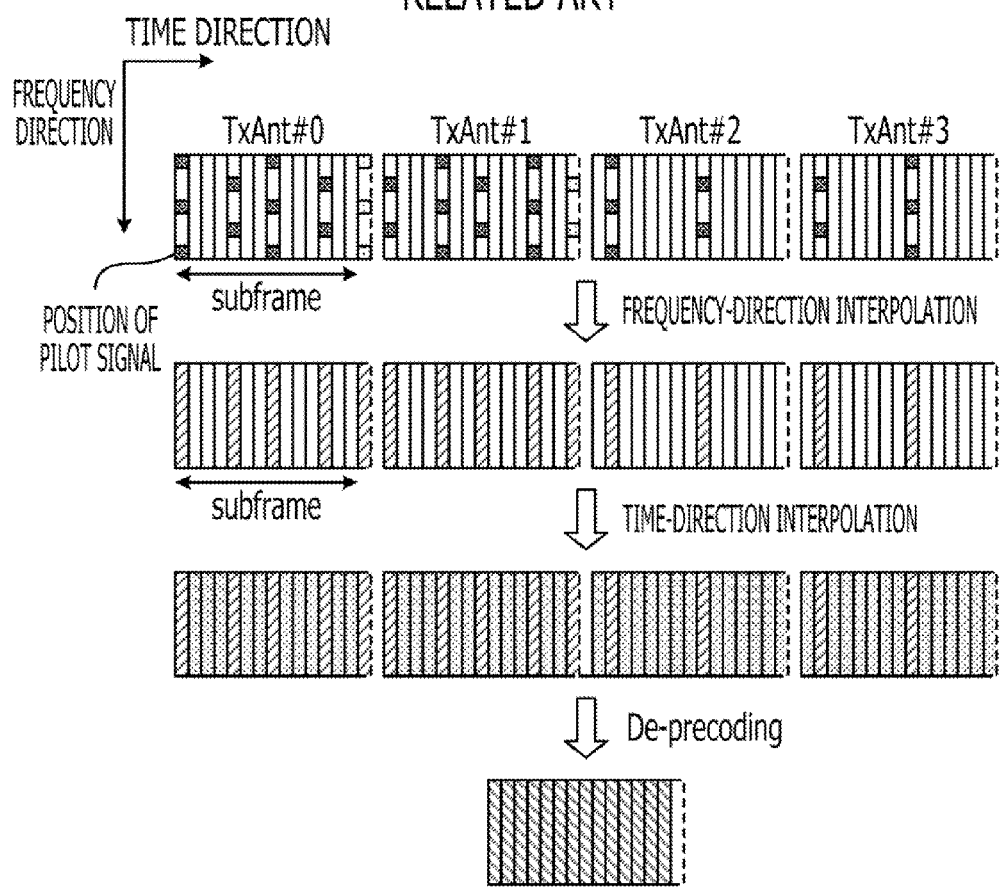

RECEIVER, COMMUNICATION SYSTEM, AND CHANNEL ESTIMATION METHOD

CROSS-REFERENCE TO RELATED APPLICATIONS

This application is based upon and claims the benefit of priority of the prior Japanese Patent Application No. 2009-228843, filed on Sep. 30, 2009, the entire contents of which are incorporated herein by reference.

FIELD

The present invention relates to a receiver, a communication system, and a channel estimation method.

BACKGROUND

In wireless communications using the Orthogonal Frequency Division Multiplexing (OFDM) system, the receiver estimates the channel using pilot signals. The pilot signals here refer to signals known by both the transmitter and receiver. For example, in a standard for high-speed mobile communications, the Long Term Evolution (LTE), pilot signals are arranged at given intervals both in the frequency direction and in the time direction.

In the case of four transmitting antennas, pilot signals are arranged at intervals of certain subcarriers in each sub-frame according to the LTE transmission format. For example, with regard to the transmitting antennas having the transmitting antenna numbers 0 and 1, pilot signals are arranged at intervals of six subcarriers in the OFDM symbols having the symbol numbers 0, 4, 7, and 11. With regard to the transmitting antennas having the transmitting antenna numbers 2 and 3, pilot signals are arranged at intervals of six subcarriers in OFDM symbols having the symbol numbers 1 and 8.

One known example of such a channel estimation method using pilot signals is a method of obtaining a channel estimation value by both frequency-direction interpolation and time-direction interpolation. Specifically, the receiver estimates the channels of resource elements (REs) where pilot signals are arranged. The receiver then performs frequency-direction interpolation and time-direction interpolation on the channel estimation values of the REs where pilot signals are arranged so as to obtain the channel estimation values of REs where no pilot signals are arranged.

On the other hand, in wireless communication systems (multiple-input multiple-output (MIMO)) using multiple transmitting antennas and receiving antennas, the transmitter precodes signals transmitted by the transmitting antennas so that the receiver may readily divide the transmitted signals.

For example, x'=Px where x represents a yet-to-be-precoded, transmitted signal, P represents a precoding matrix (or vector), and x' represents a precoded, transmitted signal.

In addition, y=Hx'=HPx where H represents a channel matrix and y represents a received signal. The receiver estimates the channel to obtain a channel estimation value matrix H' and then de-precodes the channel estimation value matrix to calculate H˜=H'P to obtain an effective channel estimation value matrix H˜. The receiver performs demodulation using the obtained effective channel estimation value matrix H˜.

Hereafter, the channel estimation process and de-precoding process will be described using an example illustrated in FIG. 10. FIG. 10 is a drawing explaining the related art and illustrates the process flow in a case where channel estimation by frequency-direction interpolation, channel estimation by time-direction interpolation, and de-precoding are performed in the presented order so as to obtain the effective channel estimation value corresponding to one sub-frame. Here, it is assumed that four transmitting antennas and one layer are provided according to the LTE transmission format.

As illustrated in FIG. 10, the receiver estimates the channels of REs where pilot signals are arranged. The receiver then performs frequency-direction interpolation using OFDM symbols containing pilot signals so as to obtain the channel estimation values of all the REs in each OFDM symbol.

The receiver then obtains the channel estimation values of symbols between each two OFDM symbols containing pilot signals by time-direction interpolation. Specifically, the receiver obtains the channel estimation values of the symbols having the symbol numbers 0, 4, 7, and 11 of the transmitting antennas having the transmitting antenna numbers 0 and 1 and those of the symbols having the symbol numbers 1 and 8 of the transmitting antennas having the transmitting antenna numbers 2 and 3 by frequency-direction interpolation, and obtains the channel estimation values of the other symbols by linear interpolation.

The channel estimation value after time-direction interpolation is obtained by Formulas (35) and (36) below. In the formulas, a represents a receiving antenna number, b represents a transmitting antenna number, n represents a sub-frame number, t represents a symbol number, and h (a, b, n, t, i) represents the channel estimation value of the subcarrier number i after frequency-direction interpolation. Note that the channel estimation value after the time-direction interpolation is represented by h (a, b, n, t, i) as with the channel estimation value after frequency-direction interpolation. This is because time-direction interpolation is performed with respect to the symbols whose channel estimation value has not been obtained in frequency-direction interpolation.

$$h(a,b,n,t,i) = \begin{cases} h(a,b,n,0,i) & (b=0,1,t=0) \\ \frac{4-t}{4}h(a,b,n,0,i) + \frac{t}{4}h(a,b,n,4,i) & (b=0,1,t=1,2,3) \\ h(a,b,n,4,i) & (b=0,1,t=4) \\ \frac{7-t}{3}h(a,b,n,4,i) + \frac{t-4}{3}h(a,b,n,7,i) & (b=0,1,t=5,6) \\ h(a,b,n,7,i) & (b=0,1,t=7) \\ \frac{11-t}{4}h(a,b,n,7,i) + \frac{t-7}{4}h(a,b,n,11,i) & (b=0,1,t=8,9,10) \\ h(a,b,n,11,i) & (b=0,1,t=11) \\ \frac{14-t}{3}h(a,b,n,11,i) + \frac{t-11}{3}h(a,b,n+1,0,i) & (b=0,1,t=12,13) \end{cases}$$
(35)

-continued $$h(a, b, n, t, i) = \begin{cases} \frac{1}{7}h(a, b, n-1, 8, i) + \frac{6}{7}h(a, b, n, 1, i) & (b = 2, 3, t = 0) \\ h(a, b, n, 1, i) & (b = 2, 3, t = 1) \\ \frac{8-t}{7}h(a, b, n, 1, i) + \frac{t-1}{7}h(a, b, n, 8, i) & (b = 2, 3, t = 2, 3, \ldots, 7) \\ h(a, b, n, 8, i) & (b = 2, 3, t = 8) \\ \frac{15-t}{7}h(a, b, n, 8, i) + \frac{t-8}{7}h(a, b, n+1, 1, i) & (b = 2, 3, t = 9, \ldots, 13) \end{cases} \quad (36)$$

Subsequently, as illustrated in FIG. 10, the channel estimation values of the four transmitting antennas are de-precoded to obtain the effective channel estimation value corresponding to one layer. The effective channel estimation value h~(a, l, n, t, i) after de-precoding where a represents a receiving antenna number, l represents a layer number, n represents a sub-frame number, t represents a symbol number, and i represents a subcarrier number is obtained by Formula (37) below. When Formulas (35) and (36) are substituted into Formula (37), the effective channel estimation values are obtained as indicated by Formulas (38) to (51) below.

$$\tilde{h}(a, 0, n, t, i) = V_0 h(a, 0, n, t, i) + V_1 h(a, 1, n, t, i) + V_2 h(a, 2, n, t, i) + V_3 h(a, 3, n, t, i) \quad (37)$$

$$\tilde{h}(a, 0, n, 0, i) = V_0 h(a, 0, n, 0, i) + V_1 h(a, 1, n, 0, i) + V_2\left(\frac{1}{7}h(a, 2, n-1, 8, i) + \frac{6}{7}h(a, 2, n, 1, i)\right) + V_3\left(\frac{1}{7}h(a, 3, n-1, 8, i) + \frac{6}{7}h(a, 3, n, 1, i)\right) \quad (38)$$

$$\tilde{h}(a, 0, n, 1, i) = V_0\left(\frac{3}{4}h(a, 0, n, 0, i) + \frac{1}{4}h(a, 0, n, 4, i)\right) + V_1\left(\frac{3}{4}h(a, 1, n, 0, i) + \frac{1}{4}h(a, 1, n, 4, i)\right) + V_2 h(a, 2, n, 1, i) + V_3 h(a, 3, n, 1, i) \quad (39)$$

$$\tilde{h}(a, 0, n, 2, i) = V_0\left(\frac{1}{2}h(a, 0, n, 0, i) + \frac{1}{2}h(a, 0, n, 4, i)\right) + V_1\left(\frac{1}{2}h(a, 1, n, 0, i) + \frac{1}{2}h(a, 1, n, 4, i)\right) + V_2\left(\frac{6}{7}h(a, 2, n, 1, i) + \frac{1}{7}h(a, 2, n, 8, i)\right) + V_3\left(\frac{6}{7}h(a, 3, n, 1, i) + \frac{1}{7}h(a, 3, n, 8, i)\right) \quad (40)$$

$$\tilde{h}(a, 0, n, 3, i) = V_0\left(\frac{1}{4}h(a, 0, n, 0, i) + \frac{3}{4}h(a, 0, n, 4, i)\right) + V_1\left(\frac{1}{4}h(a, 1, n, 0, i) + \frac{3}{4}h(a, 1, n, 4, i)\right) + V_2\left(\frac{5}{7}h(a, 2, n, 1, i) + \frac{2}{7}h(a, 2, n, 8, i)\right) + V_3\left(\frac{5}{7}h(a, 3, n, 1, i) + \frac{2}{7}h(a, 3, n, 8, i)\right) \quad (41)$$

$$\tilde{h}(a, 0, n, 4, i) = V_0 h(a, 0, n, 4, i) + V_1 h(a, 1, n, 4, i) + V_2\left(\frac{4}{7}h(a, 2, n, 1, i) + \frac{3}{7}h(a, 2, n, 8, i)\right) + V_3\left(\frac{4}{7}h(a, 3, n, 1, i) + \frac{3}{7}h(a, 3, n, 8, i)\right) \quad (42)$$

$$\tilde{h}(a, 0, n, 5, i) = V_0\left(\frac{2}{3}h(a, 0, n, 4, i) + \frac{1}{3}h(a, 0, n, 7, i)\right) + V_1\left(\frac{2}{3}h(a, 1, n, 4, i) + \frac{1}{3}h(a, 1, n, 7, i)\right) + V_2\left(\frac{3}{7}h(a, 2, n, 1, i) + \frac{4}{7}h(a, 2, n, 8, i)\right) + V_3\left(\frac{3}{7}h(a, 3, n, 1, i) + \frac{4}{7}h(a, 3, n, 8, i)\right) \quad (43)$$

$$\tilde{h}(a, 0, n, 6, i) = V_0\left(\frac{1}{3}h(a, 0, n, 4, i) + \frac{2}{3}h(a, 0, n, 7, i)\right) + V_1\left(\frac{1}{3}h(a, 1, n, 4, i) + \frac{2}{3}h(a, 1, n, 7, i)\right) + V_2\left(\frac{2}{7}h(a, 2, n, 1, i) + \frac{5}{7}h(a, 2, n, 8, i)\right) + V_3\left(\frac{2}{7}h(a, 3, n, 1, i) + \frac{5}{7}h(a, 3, n, 8, i)\right) \quad (44)$$

$$\tilde{h}(a, 0, n, 7, i) = V_0 h(a, 0, n, 7, i) + V_1 h(a, 1, n, 7, i) + V_2\left(\frac{1}{7}h(a, 2, n, 1, i) + \frac{6}{7}h(a, 2, n, 8, i)\right) + V_3\left(\frac{1}{7}h(a, 3, n, 1, i) + \frac{6}{7}h(a, 3, n, 8, i)\right) \quad (45)$$

$$\tilde{h}(a, 0, n, 8, i) = V_0\left(\frac{3}{4}h(a, 0, n, 7, i) + \frac{1}{4}h(a, 0, n, 11, i)\right) + V_1\left(\frac{3}{4}h(a, 1, n, 7, i) + \frac{1}{4}h(a, 1, n, 11, i)\right) + V_2 h(a, 2, n, 8, i) + V_3 h(a, 3, n, 8, i) \quad (46)$$

$$\tilde{h}(a, 0, n, 9, i) = V_0\left(\frac{1}{2}h(a, 0, n, 7, i) + \frac{1}{2}h(a, 0, n, 11, i)\right) + V_1\left(\frac{1}{2}h(a, 1, n, 7, i) + \frac{1}{2}h(a, 1, n, 11, i)\right) + V_2\left(\frac{6}{7}h(a, 2, n, 8, i) + \frac{1}{7}h(a, 2, n+1, 1, i)\right) + V_3\left(\frac{6}{7}h(a, 3, n, 8, i) + \frac{1}{7}h(a, 3, n+1, 1, i)\right) \quad (47)$$

$$\tilde{h}(a, 0, n, 10, i) = V_0\left(\frac{1}{4}h(a, 0, n, 7, i) + \frac{3}{4}h(a, 0, n, 11, i)\right) + V_1\left(\frac{1}{4}h(a, 1, n, 7, i) + \frac{3}{4}h(a, 1, n, 11, i)\right) + V_2\left(\frac{5}{7}h(a, 2, n, 8, i) + \frac{2}{7}h(a, 2, n+1, 1, i)\right) + V_3\left(\frac{5}{7}h(a, 3, n, 8, i) + \frac{2}{7}h(a, 3, n+1, 1, i)\right) \quad (48)$$

$$\tilde{h}(a, 0, n, 11, i) = V_0 h(a, 0, n, 11, i) + V_1 h(a, 1, n, 11, i) + V_2\left(\frac{4}{7}h(a, 2, n, 8, i) + \frac{3}{7}h(a, 2, n+1, 1, i)\right) + V_3\left(\frac{4}{7}h(a, 3, n+1, 8, i) + \frac{3}{7}h(a, 3, n+1, 1, i)\right) \quad (49)$$

-continued $$\tilde{h}(a, 0, n, 12, i) = V_0\left(\frac{2}{3}h(a, 0, n, 11, i) + \frac{1}{3}h(a, 0, n+1, 0, i)\right) + \quad (50)$$
$$V_1\left(\frac{2}{3}h(a, 1, n, 11, i) + \frac{1}{3}h(a, 1, n+1, 0, i)\right) +$$
$$V_2\left(\frac{3}{7}h(a, 2, n, 8, i) + \frac{4}{7}h(a, 2, n+1, 1, i)\right) +$$
$$V_3\left(\frac{3}{7}h(a, 3, n, 8, i) + \frac{4}{7}h(a, 3, n+1, 1, i)\right)$$

$$\tilde{h}(a, 0, n, 13, i) = V_0\left(\frac{1}{3}h(a, 0, n, 11, i) + \frac{2}{3}h(a, 0, n+1, 0, i)\right) + \quad (51)$$
$$V_1\left(\frac{1}{3}h(a, 1, n, 11, i) + \frac{2}{3}h(a, 1, n+1, 0, i)\right) +$$
$$V_2\left(\frac{2}{7}h(a, 2, n, 8, i) + \frac{5}{7}h(a, 2, n+1, 1, i)\right) +$$
$$V_3\left(\frac{2}{7}h(a, 3, n, 8, i) + \frac{5}{7}h(a, 3, n+1, 1, i)\right)$$

Examples of the above-mentioned related art include Japanese Laid-open Patent Publication No. 2008-236428.

Incidentally, for the technology involving the above-mentioned channel estimation and de-precoding processes, the effective channel estimation values are calculated by obtaining the channel estimation values of all the symbols and then performing de-precoding. Unfortunately, this increases the number of symbols to be interpolated in the time direction and the number of symbols to be de-precoded, increasing the complexity, followed by increases in power consumption.

SUMMARY

According to an aspect of the invention, a receiver includes a channel estimation unit that calculates channel estimation values of symbols containing pilot signals, from signals transmitted by a plurality of antennas so to obtain channel estimation values of symbols in the same positions of the antennas, a de-precoding unit that de-precodes the channel estimation values of the antennas calculated by the channel estimation unit to calculate effective channel estimation values, and a time-direction interpolation unit that performs time-direction interpolation using the effective channel estimation values calculated by the de-precoding unit to calculate effective channel estimation values of symbols other than the symbols containing pilot signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a drawing illustrating the related art.

DESCRIPTION OF EMBODIMENTS

Embodiments of a receiver, a communication system, and a channel estimation method according to the present invention will be described in detail with reference to the accompanying drawings.

Figure 1:
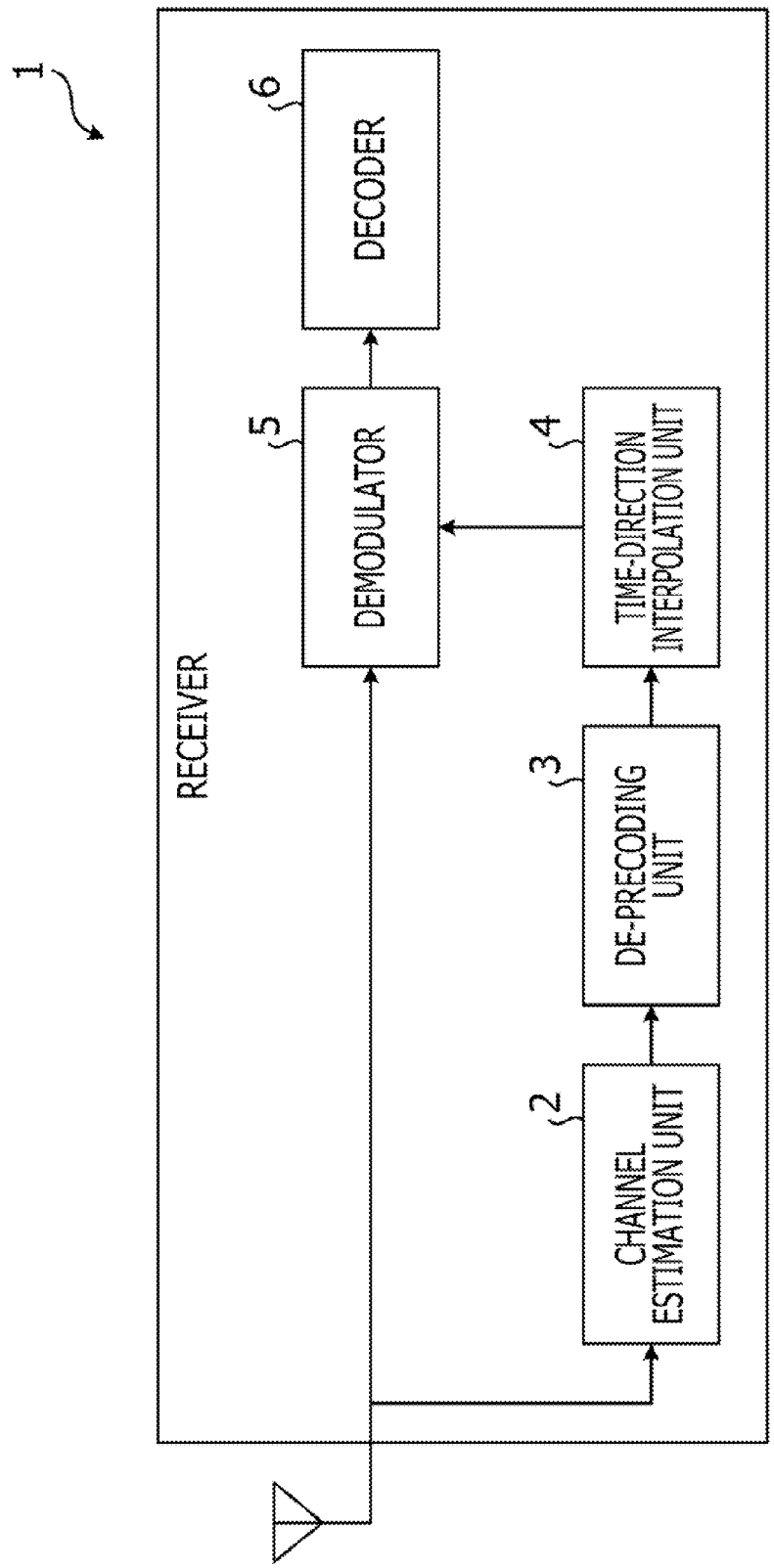
FIG. 1 illustrates the configuration of a receiver according to a first embodiment.

First, referring to FIG. 1, the configuration of a receiver according to a first embodiment will be described. FIG. 1 is a block diagram illustrating the configuration of the receiver according to the first embodiment. As illustrated in FIG. 1, a receiver 1 includes a channel estimation unit 2, a de-precoding unit 3, a time-direction interpolation unit 4, a demodulator 5, and a decoder 6. The receiver 1 receives signals transmitted by multiple transmitting antennas using a receiving antenna.

The channel estimation unit 2 calculates the channel estimation values of symbols containing pilot signals from the signals transmitted by the transmitting antennas so that the channel estimation values of symbols in the same positions of the antennas are obtained.

The de-precoding unit 3 de-precodes the channel estimation values of the antennas calculated by the channel estimation unit 2 so as to calculate effective channel estimation values. The time-direction interpolation unit 4 performs linear interpolation in the time direction using the effective channel estimation values calculated by the de-precoding unit 3 so as to calculate the effective channel estimation values of symbols other than the symbols containing pilot signals.

The demodulator 5 demodulates the transmitted signals using the effective channel estimation values calculated by the time-direction interpolation unit 4. The decoder 6 decodes the transmitted signals demodulated by the demodulator 5.

As seen, the receiver 1 obtains the channel estimation values of the symbols in the same positions of the antennas, as well as calculates the channel estimation values of the symbols containing pilot signals and de-precodes the latter channel estimation values. This may reduce the number of symbols to be interpolated in the time direction and the number of symbols to be de-precoded so as to reduce the complexity, resulting in reductions in power consumption to low levels.

Figure 2:
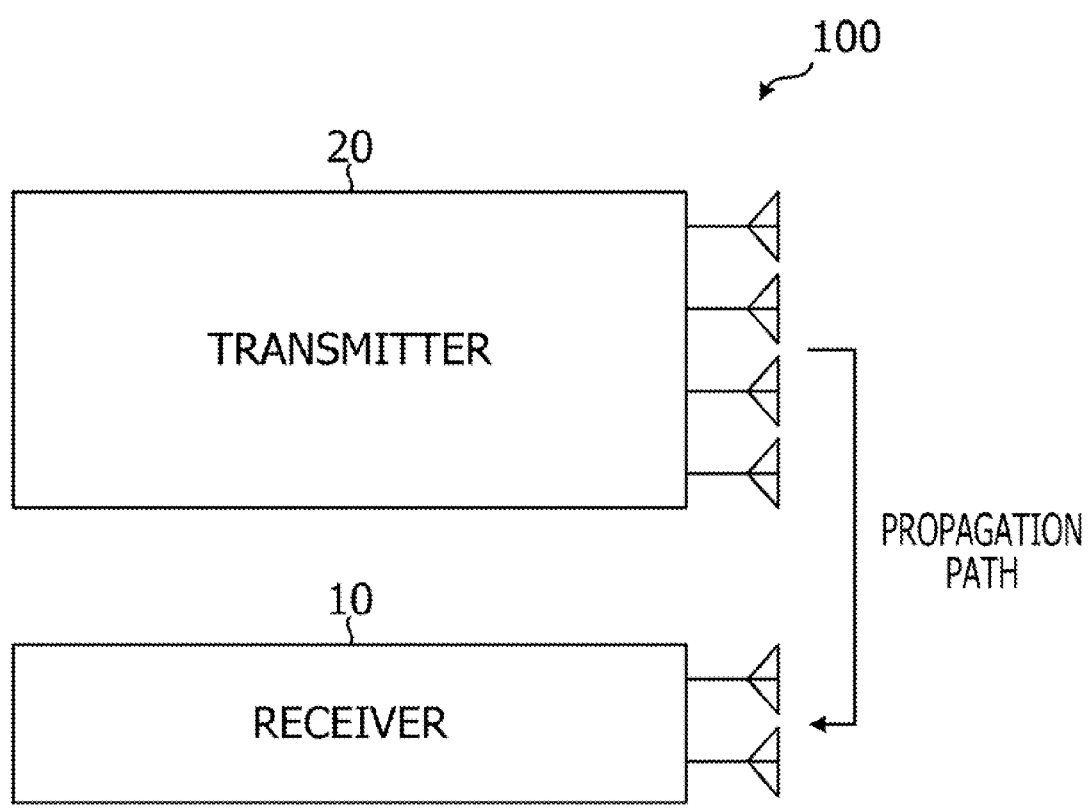
FIG. 2 is a block diagram illustrating the configuration of a MIMO-OFDM system according to a second embodiment.

Referring now to FIG. 2, the configuration of a MIMO-OFDM system will be described. FIG. 2 is a block diagram illustrating the configuration of a MIMO-OFDM system according to a second embodiment. As illustrated, a MIMO-OFDM system 100 includes a receiver 10 provided with multiple receiving antennas and a transmitter 20 provided with multiple transmitting antennas. The receiver 10 and transmitter 20 communicate with each other wirelessly via multiple propagation paths.

The transmitter 20 transmits various signals to the receiver 10 using the multiple transmitting antennas. The signals transmitted by the transmitter 20 are transmitted to the receiver 10 via the multiple propagation paths. The transmitter 20 also assigns the subcarriers of OFDM symbols to pieces of data to be transmitted to the receiver 10. The receiver 10 receives the signals and demodulates them on a subcarrier basis to obtain each data.

Figure 3:
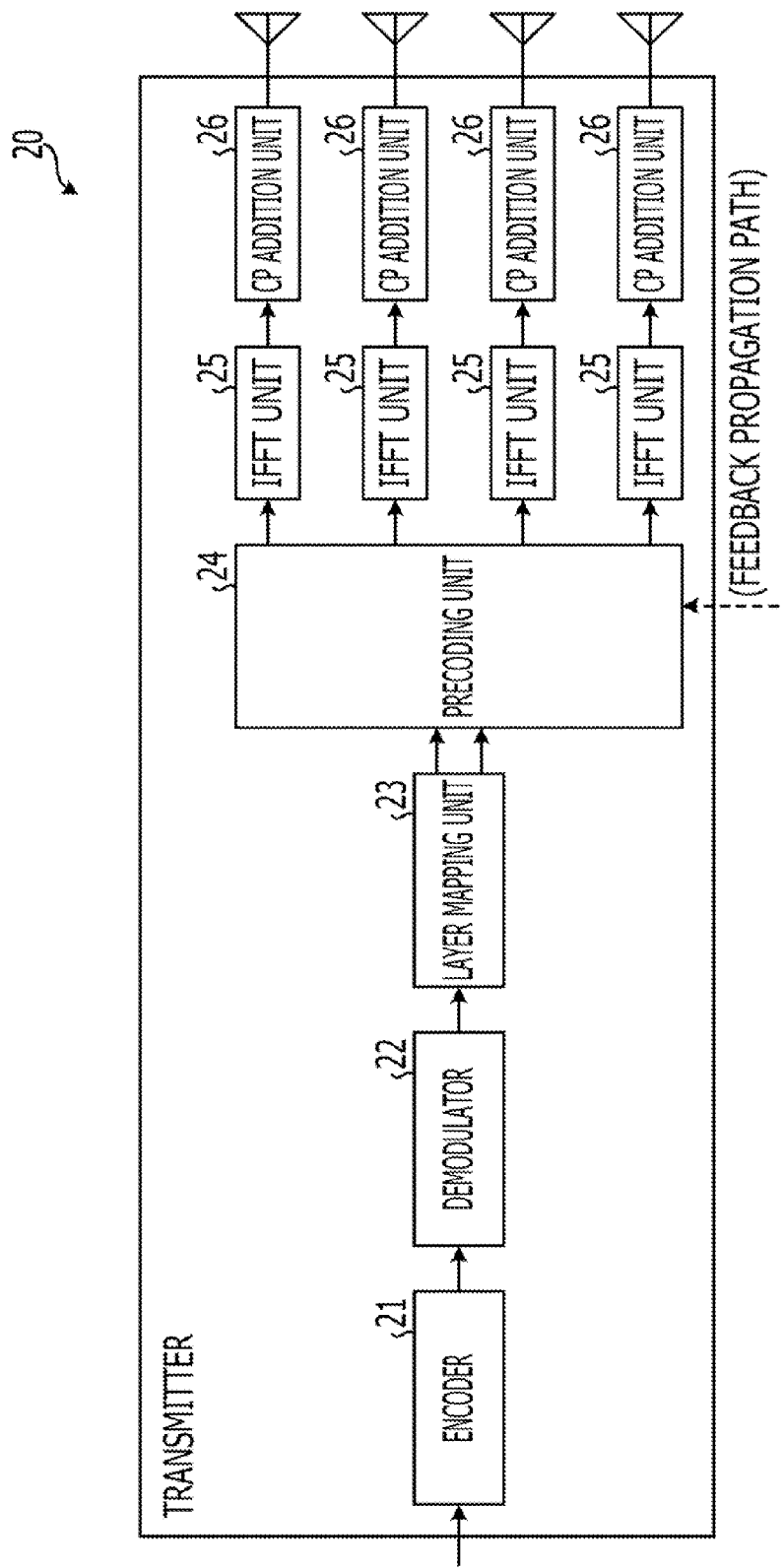
FIG. 3 is a block diagram illustrating the configuration of a transmitter according to the second embodiment.

Referring now to FIG. 3, the configuration of the transmitter 20 will be described. FIG. 3 is a block diagram illustrating the configuration of the transmitter according to the second embodiment. As illustrated in FIG. 3, the transmitter 20 includes an encoder 21, a demodulator 22, a layer mapping unit 23, a precoding unit 24, Inverse Fast Fourier Transform (IFFT) units 25, and Cyclic Prefix (CP) addition units 26. The processes these components perform will be described below.

The encoder 21 encodes a bit sequence to be transmitted (e.g., turbo coding) and inputs the encoded bit sequence to the demodulator 22. The demodulator 22 modulates the encoded bit sequence into a transmission symbol (e.g., Quadrature Phase Sift Keying (QPSK), 16-State Quadrature Amplitude Modulation (16QAM)) and inputs the transmission symbol into the layer mapping unit 23. The layer mapping unit 23 divides the demodulated signal into multiple layers and inputs the layers into the precoding unit 24.

The layers here refer to mutually independent signal sequences and are subjected to precoding (to be discussed later) and then distributed to the transmitting antennas. Precoding refers to that, in the case of, e.g., two layers and four transmitting antennas, the transmitter generates four not independent signals from two independent signals by a linear operation and transmits the generated signals using the four transmitting antennas. In the above case, the receiver receives the signals transmitted by the four transmitting antennas, but these signals include only two independent ones actually.

The precoding unit 24 maps signals generated by combining the signals of each layer to the transmitting antennas. Specifically, the precoding unit 24 combines the signals of each layer by multiplying the signals by a precoding matrix (rows number=transmitting antennas number, columns number=layers number) and maps the combined signals to the transmitting antennas. Such a precoding matrix is determined depending on the pattern shared by the transmitter and receiver or the precoding matrix indicator (PMI) fed back by the receiver.

The IFFT units 25 corresponding to the transmitting antennas transform the frequency-area signals into time-area signals by IFFT and outputs the time-area signals. The CP addition units 26 corresponding to the transmitting antennas add cyclic prefixes (CPs) to the time-area signals. The resultant time-area signals are transmitted from the multiple transmitting antennas to the receiver 10.

Figure 4:
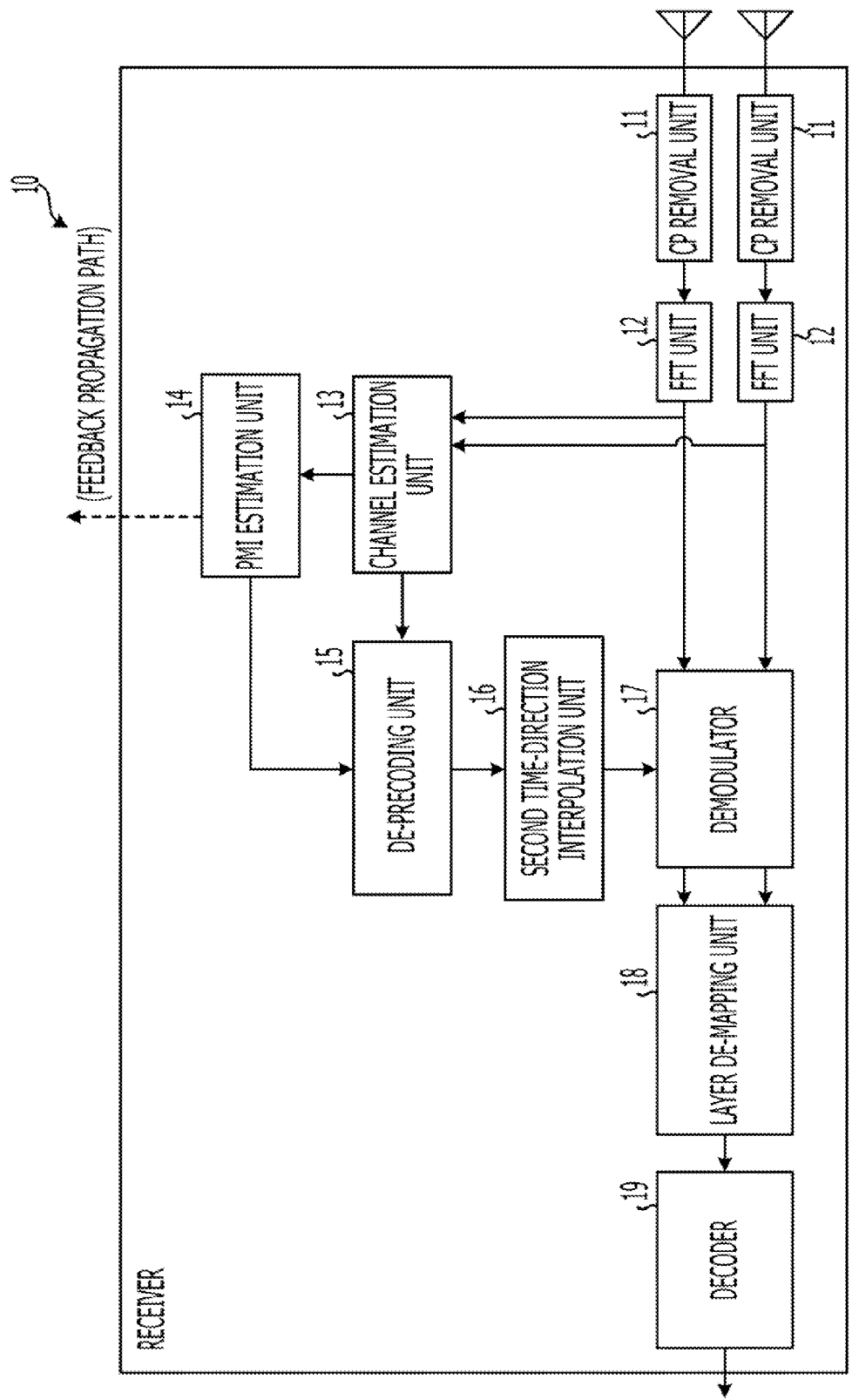
FIG. 4 is a block diagram illustrating the configuration of a receiver according to the second embodiment.

Referring now to FIG. 4, the configuration of the receiver 10 will be described. FIG. 4 is a block diagram illustrating the configuration of the receiver according to the second embodiment. As illustrated in FIG. 4, the receiver 10 includes CP removal units 11, Fast Fourier Transform (FFT) units 12, a channel estimation unit 13, a PMI estimation unit 14, a de-precoding unit 15, a second time-direction interpolation unit 16, a demodulator 17, a layer mapping unit 18, and a decoder 19. The processes these components perform will be described below.

The CP removal units 11 corresponding to the receiving antennas remove the CPs from the time-area signals and input the resultant time-area signals into the FFT units 12. The FFT units 12 corresponding to the receiving antennas transform the inputted time-area signals into frequency-area signals by FFT and input the frequency-area signals into both the channel estimation unit 13 and demodulator 17.

The channel estimation unit 13 calculates the channel estimation values of symbols containing pilot signals from the signals transmitted by each of a certain transmitting antenna. And also, the channel estimation unit 13 linearly interpolates the channel estimation values of symbols corresponding to the positions of symbols containing pilot signals from the signals transmitted by the other transmitting antennas so that the channel estimation values of symbols in the same positions of the antennas are obtained.

The channel estimation value here refers to a value indicating a channel variation between each transmitting antenna and each receiving antenna or a matrix where values indicating channel variations between each transmitting antenna and each receiving antenna are arranged.

Figure 5:
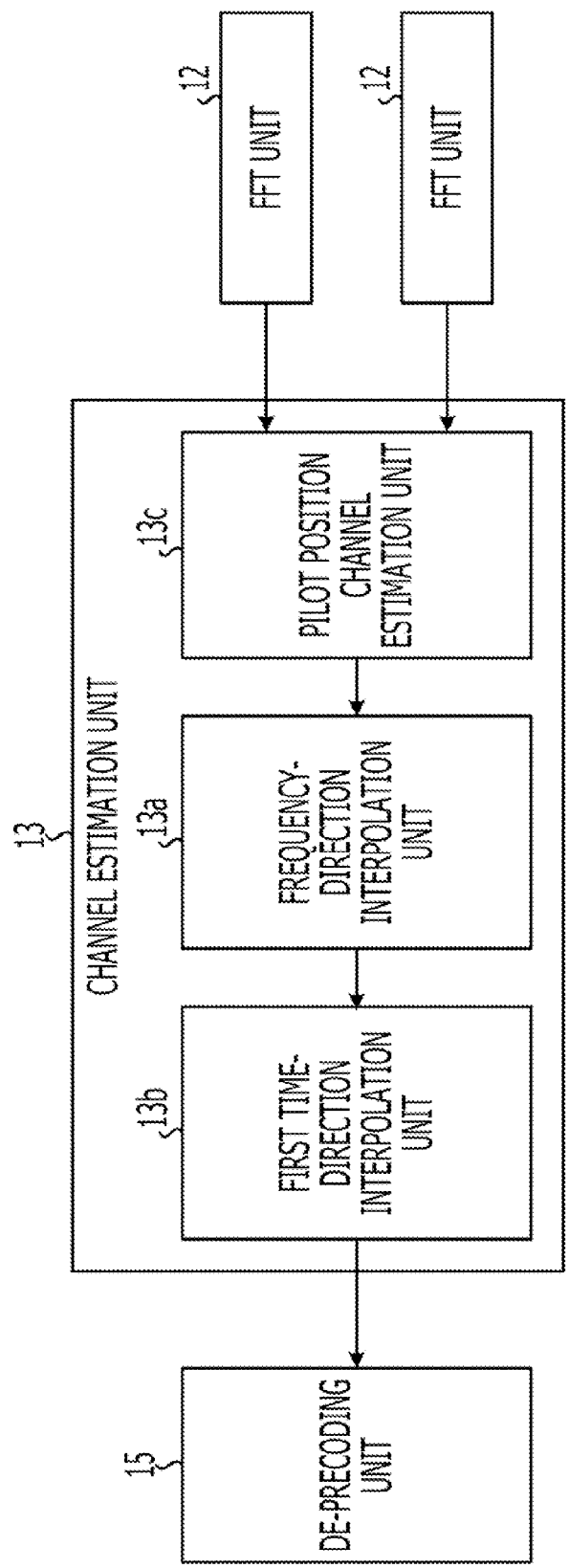
FIG. 5 is a block diagram illustrating the detailed configuration of the channel estimation unit of the receiver according to the second embodiment.

Referring now to FIG. 5, the detailed configuration of the channel estimation unit 13 will be described. FIG. 5 is a block diagram illustrating the detailed configuration of the channel estimation unit of the receiver according to the second embodiment. As illustrated in FIG. 5, the channel estimation unit 13 includes a frequency-direction interpolation unit 13a, a first time-direction interpolation unit 13b, and a pilot position channel estimation unit 13c.

The pilot position channel estimation unit 13c obtains the channel estimation values of resource elements where pilot signals are arranged. The frequency-direction interpolation unit 13a then performs linear interpolation in the frequency direction using the channel estimation values of the resource elements where pilot signals are arranged so as to obtain the channel estimation values of all the resource elements in OFDM symbols and inputs the obtained channel estimation values into the first time-direction interpolation unit 13b.

The first time-direction interpolation unit 13b performs linear interpolation in the time direction using the channel estimation values of the OFDM symbols where pilot signals are arranged. Specifically, the first time-direction interpolation unit 13b performs time-direction interpolation using the channel estimation values of the OFDM symbols containing pilot signals, of the transmitted signals.

Figure 6:
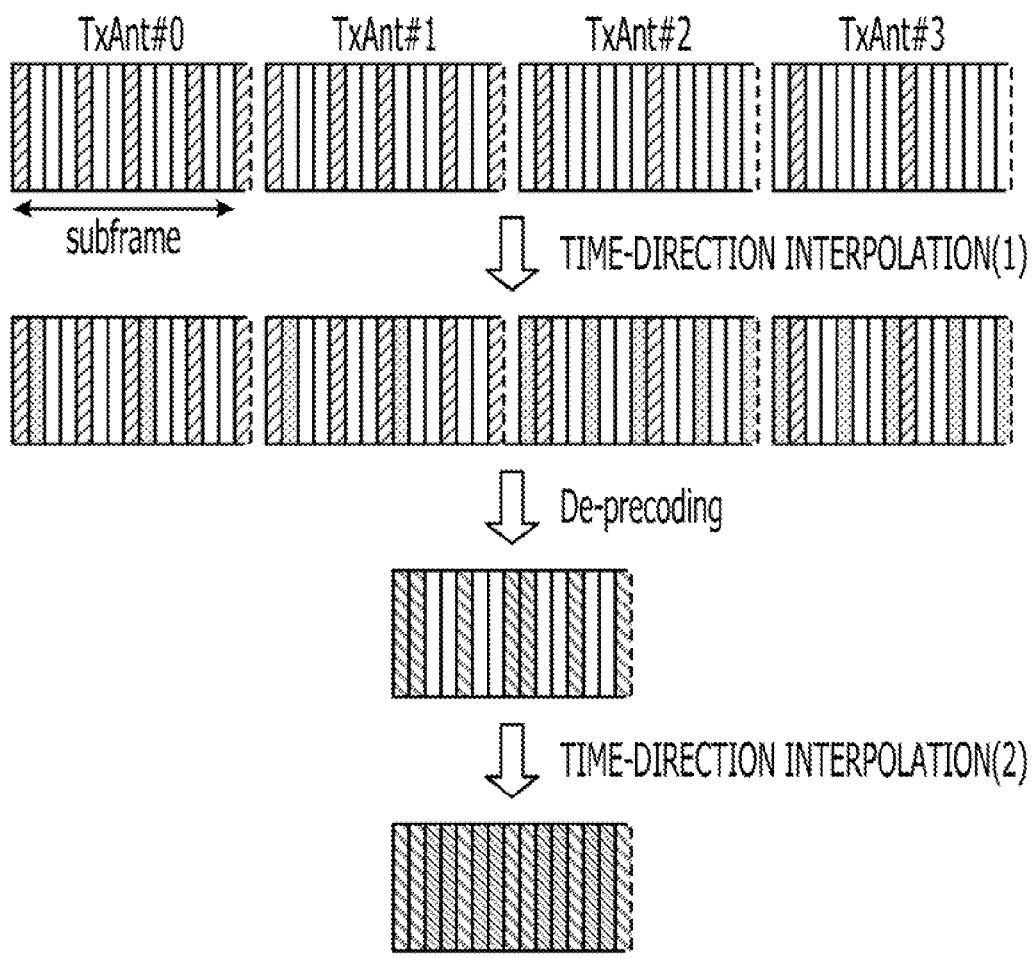
FIG. 6 is a drawing illustrating time-direction interpolation and de-precoding.

The above process will be described specifically using the example illustrated in FIG. 6. For example, the transmitter 20 is provided with four antennas having the transmitting antenna numbers 0 to 3. As illustrated in FIG. 6, with regard to the signals having the transmitting antenna numbers 0 and 1 (TxAnt#0, 1 in FIG. 6) of those transmitted by the above-mentioned transmitting antennas, pilot signals are arranged in the OFDM symbols having the symbol numbers 0, 4, 7, and 11. On the other hand, with regard to the signals transmitted by the transmitting antennas having the transmitting antenna numbers 2 and 3 (TxAnt#2, 3 in FIG. 6), pilot signals are arranged in the OFDM symbols having the symbol numbers 1 and 8.

In such a case, as indicated by Formula (1) below, the pilot position channel estimation unit 13c and frequency-direction interpolation unit 13a obtain the channel estimation values of the OFDM symbols having the symbol numbers 0, 4, 7, and 11 from the signals transmitted by the transmitting antennas having the transmitting antenna numbers 0 and 1. The first time-direction interpolation unit 13b then performs time-direction interpolation using the channel estimation values of the OFDM symbols having the symbol numbers 0, 4, 7, and 11 so as to obtain the channel estimation values of the OFDM symbols having the symbol numbers 1 and 8, as indicated by Formula (1) below.

$$h(a, b, n, t, i) = \qquad (1)$$

$$\begin{cases} h(a, b, n, 0, i) & (b = 0, 1, t = 0) \\ \frac{3}{4}h(a, b, n, 0, i) + \frac{1}{4}h(a, b, n, 4, i) & (b = 0, 1, t = 1) \\ h(a, b, n, 4, i) & (b = 0, 1, t = 4) \\ h(a, b, n, 7, i) & (b = 0, 1, t = 7) \\ \frac{3}{4}h(a, b, n, 7, i) + \frac{1}{4}h(a, b, n, 11, i) & (b = 0, 1, t = 8) \\ h(a, b, n, 11, i) & (b = 0, 1, t = 11) \end{cases}$$

Also, as indicated by Formula (2) below, the pilot position channel estimation unit 13c and frequency-direction interpolation unit 13a obtain the channel estimation values of the OFDM symbols having the symbol numbers 1 and 8 of the signals transmitted by the transmitting antennas having the transmitting antenna numbers 2 and 3. The first time-direction interpolation unit 13b then performs time-direction interpolation using the channel estimation values of the OFDM symbols having the symbol numbers 1 and 8 so as to obtain the channel estimation values of the OFDM symbols having the symbol numbers 0, 4, 7, and 11, as indicated by Formula (2). The obtained channel estimation values of the OFDM symbols having the symbol numbers 0, 1, 4, 7, 8, and 11 of all the transmitting antennas are inputted into the PMI estimation unit 14 and de-precoding unit 15.

$$h(a, b, n, t, i) = \qquad (2)$$

$$\begin{cases} \frac{1}{7}h(a, b, n-1, 8, i) + \frac{6}{7}h(a, b, n, 1, i) & (b = 2, 3, t = 0) \\ h(a, b, n, 1, i) & (b = 2, 3, t = 1) \\ \frac{4}{7}h(a, b, n, 1, i) + \frac{3}{7}h(a, b, n, 8, i) & (b = 2, 3, t = 4) \\ \frac{1}{7}h(a, b, n, 1, i) + \frac{6}{7}h(a, b, n, 8, i) & (b = 2, 3, t = 7) \\ h(a, b, n, 8, i) & (b = 2, 3, t = 8) \\ \frac{4}{7}h(a, b, n, 8, i) + \frac{3}{7}h(a, b, n+1, 1, i) & (b = 2, 3, t = 11) \end{cases}$$

The PMI estimation unit 14 selects an optimum PMI from the channel estimation values and feeds back the optimum PMI to the transmitter 20. The de-precoding unit 15 de-precodes the channel estimation values of the antennas to calculate effective channel estimation values. The effective channel estimation value here refers to a value indicating a channel variation between each layer and each receiving antenna. An effective channel estimation value matrix where the effective channel estimation values between each layer and each receiving antenna are arranged is obtained by multiplying a channel estimation value matrix where channel estimation values between each transmitting antenna and each receiving antenna are arranged by a precoding matrix.

The precoding matrix to be used in the multiplication is determined depending on the pattern shared by the transmitter and receiver or the PMI previously fed back to the transmitter 20.

The above process will be described with reference to FIG. 6. As indicated by Formulas (3) to (8) below, the de-precoding unit 15 de-precodes the channel estimation values of the OFDM symbols having the symbol numbers 0, 1, 4, 7, 8, and 11 calculated by the first time-direction interpolation unit 13b so as to calculate the effective channel estimation values. The de-precoding unit 15 then inputs the obtained effective channel estimation values of the OFDM symbols having the symbol numbers 0, 1, 4, 7, 8, and 11 into the second time-direction interpolation unit 16.

$$\tilde{h}(a, 0, n, 0, i) = V_0 h(a, 0, n, 0, i) + V_1 h(a, 1, n, 0, i) + \qquad (3)$$
$$V_2\left(\frac{1}{7}h(a, 2, n-1, 8, i) + \frac{6}{7}h(a, 2, n, 1, i)\right) +$$
$$V_3\left(\frac{1}{7}h(a, 3, n-1, 8, i) + \frac{6}{7}h(a, 3, n, 1, i)\right)$$

$$\tilde{h}(a, 0, n, 1, i) = V_0\left(\frac{3}{4}h(a, 0, n, 0, i) + \frac{1}{4}h(a, 0, n, 4, i)\right) + \qquad (4)$$
$$V_1\left(\frac{3}{4}h(a, 1, n, 0, i) + \frac{1}{4}h(a, 1, n, 4, i)\right) +$$
$$V_2 h(a, 2, n, 1, i) + V_3 h(a, 3, n, 1, i)$$

$$\tilde{h}(a, 0, n, 4, i) = V_0 h(a, 0, n, 4, i) + \qquad (5)$$
$$V_1 h(a, 1, n, 4, i) + V_2\left(\frac{4}{7}h(a, 2, n, 1, i) + \frac{3}{7}h(a, 2, n, 8, i)\right) +$$
$$V_3\left(\frac{4}{7}h(a, 3, n, 1, i) + \frac{3}{7}h(a, 3, n, 8, i)\right)$$

$$\tilde{h}(a, 0, n, 7, i) = V_0 h(a, 0, n, 7, i) + \qquad (6)$$
$$V_1 h(a, 1, n, 7, i) + V_2\left(\frac{1}{7}h(a, 2, n, 1, i) + \frac{6}{7}h(a, 2, n, 8, i)\right) +$$
$$V_3\left(\frac{1}{7}h(a, 3, n, 1, i) + \frac{6}{7}h(a, 3, n, 8, i)\right)$$

$$\tilde{h}(a, 0, n, 8, i) = V_0\left(\frac{3}{4}h(a, 0, n, 7, i) + \frac{1}{4}h(a, 0, n, 11, i)\right) + \qquad (7)$$
$$V_1\left(\frac{3}{4}h(a, 1, n, 7, i) + \frac{1}{4}h(a, 1, n, 11, i)\right) +$$
$$V_2 h(a, 2, n, 8, i) + V_3 h(a, 3, n, 8, i)$$

$$\tilde{h}(a, 0, n, 11, i) = V_0 h(a, 0, n, 11, i) + V_1 h(a, 1, n, 11, i) + \qquad (8)$$
$$V_2\left(\frac{4}{7}h(a, 2, n, 8, i) + \frac{3}{7}h(a, 2, n+1, 1, i)\right) +$$
$$V_3\left(\frac{4}{7}h(a, 3, n+1, 8, i) + \frac{3}{7}h(a, 3, n+1, 1, i)\right)$$

The second time-direction interpolation unit 16 performs linear interpolation in the time direction using the effective channel estimation values so as to calculate effective channel estimation values of symbols other than the symbols containing pilot signals. This will be described with reference to FIG. 6. The second time-direction interpolation unit 16 performs linear interpolation in the time direction using the effective channel estimation values of the OFDM symbols having the symbol numbers 0, 1, 4, 7, 8, and 11 so as to calculate the effective channel estimation values of the OFDM symbols having the symbol numbers 2, 3, 5, 6, 9, and 10.

Here, in order to obtain the effective channel estimation values of the OFDM symbols having the symbol numbers 12 and 13, the second time-direction interpolation unit 16 requires the effective channel estimation value of the OFDM symbol having the symbol number 0 of the subsequent sub-frame. Specifically, the same precoding method needs to have been applied to two symbols (in this example, the symbol having the symbol number 11 and the symbol having the symbol number 0 of the subsequent sub-frame) to be used in time-direction linear interpolation. Different precoding, however, may have been applied to the subsequent sub-frame, so linear interpolation cannot be simply performed.

For this reason, as indicated by Formula (9) below, the second time-direction interpolation unit 16 de-precodes the channel estimation value of the symbol having the symbol number 0 of the subsequent sub-frame using the precoding method applied to the current sub-frame so as to obtain the effective channel estimation value.

$$\tilde{h}(a, 0, n+1, 0, i) = V_0 h(a, 0, n+1, 0, i) + V_1 h(a, 1, n+1, 0, i) + \quad (9)$$
$$V_2\left(\frac{1}{7}h(a, 2, n, 8, i) + \frac{6}{7}h(a, 2, n+1, 1, i)\right) +$$
$$V_3\left(\frac{1}{7}h(a, 3, n, 8, i) + \frac{6}{7}h(a, 3, n+1, 1, i)\right)$$

Then, as indicated by Formulas (10) to (15) below, the second time-direction interpolation unit 16 calculates the effective channel estimation values of the OFDM symbols having the symbol numbers 2, 3, 5, 6, 9, and 10 using the effective channel estimation values of the OFDM symbols having the symbol numbers 0, 1, 4, 7, 8, and 11.

$$\tilde{h}(a, 0, n, 2, i) = \frac{2}{3}\tilde{h}(a, 0, n, 1, i) + \frac{1}{3}\tilde{h}(a, 0, n, 4, i) \quad (10)$$
$$= \frac{2}{3}\begin{pmatrix} V_0\left(\frac{3}{4}h(a, 0, n, 0, i) + \frac{1}{4}h(a, 0, n, 4, i)\right) + \\ V_1\left(\frac{3}{4}h(a, 1, n, 0, i) + \frac{1}{4}h(a, 1, n, 4, i)\right) + \\ V_2 h(a, 2, n, 1, i) + V_3 h(a, 3, n, 1, i) \end{pmatrix} +$$
$$\frac{1}{3}\begin{pmatrix} V_0 h(a, 0, n, 4, i) + V_1 h(a, 1, n, 4, i) + \\ V_2\left(\frac{4}{7}h(a, 2, n, 1, i) + \frac{3}{7}h(a, 2, n, 8, i)\right) + \\ V_3\left(\frac{4}{7}h(a, 3, n, 1, i) + \frac{3}{7}h(a, 3, n, 8, i)\right) \end{pmatrix}$$
$$= V_0\left(\frac{1}{2}h(a, 0, n, 0, i) + \frac{1}{2}h(a, 0, n, 4, i)\right) +$$
$$V_1\left(\frac{1}{2}h(a, 1, n, 0, i) + \frac{1}{2}h(a, 1, n, 4, i)\right) +$$
$$V_2\left(\frac{6}{7}h(a, 2, n, 1, i) + \frac{1}{7}h(a, 2, n, 8, i)\right) +$$
$$V_3\left(\frac{6}{7}h(a, 3, n, 1, i) + \frac{1}{7}h(a, 3, n, 8, i)\right)$$

$$\tilde{h}(a, 0, n, 3, i) = \frac{1}{3}\tilde{h}(a, 0, n, 1, i) + \frac{2}{3}\tilde{h}(a, 0, n, 4, i) \quad (11)$$
$$= V_0\left(\frac{1}{4}h(a, 0, n, 0, i) + \frac{3}{4}h(a, 0, n, 4, i)\right) +$$
$$V_1\left(\frac{1}{4}h(a, 1, n, 0, i) + \frac{3}{4}h(a, 1, n, 4, i)\right) +$$
$$V_2\left(\frac{5}{7}h(a, 2, n, 1, i) + \frac{2}{7}h(a, 2, n, 8, i)\right) +$$
$$V_3\left(\frac{5}{7}h(a, 3, n, 1, i) + \frac{2}{7}h(a, 3, n, 8, i)\right)$$

$$\tilde{h}(a, 0, n, 5, i) = \frac{2}{3}\tilde{h}(a, 0, n, 4, i) + \frac{1}{3}\tilde{h}(a, 0, n, 7, i) \quad (12)$$
$$= \frac{2}{3}\begin{pmatrix} V_0 h(a, 0, n, 4, i) + V_1 h(a, 1, n, 4, i) + \\ V_2\left(\frac{4}{7}h(a, 2, n, 1, i) + \frac{3}{7}h(a, 2, n, 8, i)\right) + \\ V_3\left(\frac{4}{7}h(a, 3, n, 1, i) + \frac{3}{7}h(a, 3, n, 8, i)\right) \end{pmatrix} +$$
$$\frac{1}{3}\begin{pmatrix} V_0 h(a, 0, n, 7, i) + V_1 h(a, 1, n, 7, i) + \\ V_2\left(\frac{1}{7}h(a, 2, n, 1, i) + \frac{6}{7}h(a, 2, n, 8, i)\right) + \\ V_3\left(\frac{1}{7}h(a, 3, n, 1, i) + \frac{6}{7}h(a, 3, n, 8, i)\right) \end{pmatrix}$$
$$= V_0\left(\frac{2}{3}h(a, 0, n, 4, i) + \frac{1}{3}h(a, 0, n, 7, i)\right) +$$
$$V_1\left(\frac{2}{3}h(a, 1, n, 4, i) + \frac{1}{3}h(a, 1, n, 7, i)\right) +$$
$$V_2\left(\frac{3}{7}h(a, 2, n, 1, i) + \frac{4}{7}h(a, 2, n, 8, i)\right) +$$
$$V_3\left(\frac{3}{7}h(a, 3, n, 1, i) + \frac{4}{7}h(a, 3, n, 8, i)\right)$$

$$\tilde{h}(a, 0, n, 6, i) = \frac{1}{3}\tilde{h}(a, 0, n, 4, i) + \frac{2}{3}\tilde{h}(a, 0, n, 7, i) \quad (13)$$
$$= V_0\left(\frac{1}{3}h(a, 0, n, 4, i) + \frac{2}{3}h(a, 0, n, 7, i)\right) +$$
$$V_1\left(\frac{1}{3}h(a, 1, n, 4, i) + \frac{2}{3}h(a, 1, n, 7, i)\right) +$$
$$V_2\left(\frac{2}{7}h(a, 2, n, 1, i) + \frac{5}{7}h(a, 2, n, 8, i)\right) +$$
$$V_3\left(\frac{2}{7}h(a, 3, n, 1, i) + \frac{5}{7}h(a, 3, n, 8, i)\right)$$

$$\tilde{h}(a, 0, n, 9, i) = \frac{2}{3}\tilde{h}(a, 0, n, 8, i) + \frac{1}{3}\tilde{h}(a, 0, n, 11, i) \quad (14)$$
$$= \frac{2}{3}\begin{pmatrix} V_0\left(\frac{3}{4}h(a, 0, n, 7, i) + \frac{1}{4}h(a, 0, n, 11, i)\right) + \\ V_1\left(\frac{3}{4}h(a, 1, n, 7, i) + \frac{1}{4}h(a, 1, n, 11, i)\right) + \\ V_2 h(a, 2, n, 8, i) + V_3 h(a, 3, n, 8, i) \end{pmatrix} +$$
$$\frac{1}{3}\begin{pmatrix} V_0 h(a, 0, n, 11, i) + V_1 h(a, 1, n, 11, i) + \\ V_2\left(\frac{4}{7}h(a, 2, n, 8, i) + \frac{3}{7}h(a, 2, n+1, 1, i)\right) + \\ V_3\left(\frac{4}{7}h(a, 3, n, 8, i) + \frac{3}{7}h(a, 3, n+1, 1, i)\right) \end{pmatrix}$$
$$= V_0\left(\frac{1}{2}h(a, 0, n, 7, i) + \frac{1}{2}h(a, 0, n, 11, i)\right) +$$
$$V_1\left(\frac{1}{2}h(a, 1, n, 7, i) + \frac{1}{2}h(a, 1, n, 11, i)\right) +$$
$$V_2\left(\frac{6}{7}h(a, 2, n, 8, i) + \frac{1}{7}h(a, 2, n+1, 1, i)\right) +$$
$$V_3\left(\frac{6}{7}h(a, 3, n, 8, i) + \frac{1}{7}h(a, 3, n+1, 1, i)\right)$$

$$\tilde{h}(a, 0, n, 10, i) = \frac{1}{3}\tilde{h}(a, 0, n, 7, i) + \frac{2}{3}\tilde{h}(a, 0, n, 11, i) \quad (15)$$
$$= V_0\left(\frac{1}{4}h(a, 0, n, 7, i) + \frac{3}{4}h(a, 0, n, 11, i)\right) +$$
$$V_1\left(\frac{1}{4}h(a, 1, n, 7, i) + \frac{3}{4}h(a, 1, n, 11, i)\right) +$$
$$V_2\left(\frac{5}{7}h(a, 2, n, 8, i) + \frac{2}{7}h(a, 2, n+1, 1, i)\right) +$$
$$V_3\left(\frac{5}{7}h(a, 3, n, 8, i) + \frac{2}{7}h(a, 3, n+1, 1, i)\right)$$

Then, as indicated by Formulas (16) to (17) below, the second time-direction interpolation unit 16 calculates the effective channel estimation values of the OFDM symbols having the symbol numbers 12 and 13 using the effective channel estimation value of the OFDM symbol having the symbol number 11 and that of the OFDM symbol having the symbol number 0 of the subsequent sub-frame obtained by Formula (9). The second time-direction interpolation unit 16 then inputs the calculated effective channel estimation values into the demodulator 17.

$$\tilde{h}(a, 0, n, 12, i) = \frac{2}{3}\tilde{h}(a, 0, n, 11, i) + \frac{1}{3}\tilde{h}(a, 0, n+1, 0, i) \quad (16)$$

$$= \frac{2}{3}\begin{pmatrix} V_0 h(a, 0, n, 11, i) + V_1 h(a, 1, n, 11, i) + \\ V_2\left(\frac{4}{7}h(a, 2, n, 8, i) + \frac{3}{7}h(a, 2, n+1, 1, i)\right) + \\ V_3\left(\frac{4}{7}h(a, 3, n, 8, i) + \frac{3}{7}h(a, 3, n+1, 1, i)\right) \end{pmatrix} +$$

$$\frac{1}{3}\begin{pmatrix} V_0 h(a, 0, n+1, 0, i) + V_1 h(a, 1, n+1, 0, i) + \\ V_2\left(\frac{1}{7}h(a, 2, n, 8, i) + \frac{6}{7}h(a, 2, n+1, 1, i)\right) + \\ V_3\left(\frac{1}{7}h(a, 3, n, 8, i) + \frac{6}{7}h(a, 3, n+1, 1, i)\right) \end{pmatrix}$$

$$= V_0\left(\frac{2}{3}h(a, 0, n, 11, i) + \frac{1}{3}h(a, 0, n+1, 0, i)\right) +$$
$$V_1\left(\frac{2}{3}h(a, 1, n, 11, i) + \frac{1}{3}h(a, 1, n+1, 0, i)\right) +$$
$$V_2\left(\frac{3}{7}h(a, 2, n, 8, i) + \frac{4}{7}h(a, 2, n+1, 1, i)\right) +$$
$$V_3\left(\frac{3}{7}h(a, 3, n, 8, i) + \frac{4}{7}h(a, 3, n+1, 1, i)\right)$$

$$\tilde{h}(a, 0, n, 13, i) = \frac{1}{3}\tilde{h}(a, 0, n, 11, i) + \frac{2}{3}\tilde{h}(a, 0, n+1, 0, i) \quad (17)$$

$$= V_0\left(\frac{1}{3}h(a, 0, n, 11, i) + \frac{2}{3}h(a, 0, n+1, 0, i)\right) +$$
$$V_1\left(\frac{1}{3}h(a, 1, n, 11, i) + \frac{2}{3}h(a, 1, n+1, 0, i)\right) +$$
$$V_2\left(\frac{2}{7}h(a, 2, n, 8, i) + \frac{5}{7}h(a, 2, n+1, 1, i)\right) +$$
$$V_3\left(\frac{2}{7}h(a, 3, n, 8, i) + \frac{5}{7}h(a, 3, n+1, 1, i)\right)$$

The demodulator 17 performs demodulation using the effective channel estimation values. Specifically, the demodulator 17 removes channel variations or noise relating to the received symbols using the effective channel estimation values, converts the resultant received symbols into layer-specific log-likelihood ratios, and inputs the log-likelihood ratios into the layer mapping unit 18.

The layer mapping unit 18 converts the layer-specific log-likelihood ratios obtained by the demodulator 17 into sequences to be inputted to the decoding unit 19. The decoder 19 cancels the encoding performed by the transmitter 20 to correct errors.

Figure 7:
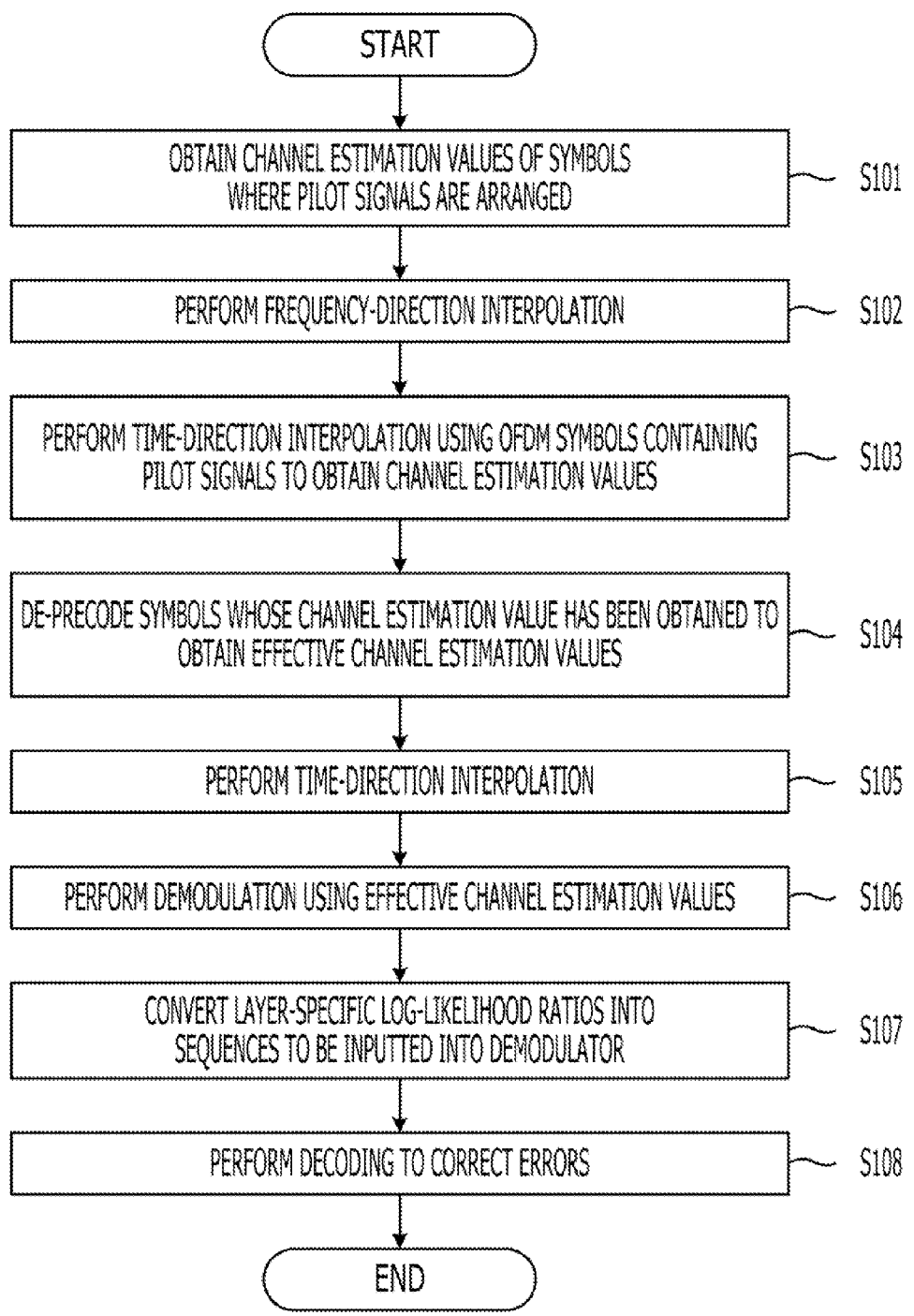
FIG. 7 is a flowchart illustrating the process steps that the receiver according to the second embodiment performs.

Referring now to FIG. 7, the process the receiver 10 according to the second embodiment performs will be described. FIG. 7 is a flowchart illustrating the process the receiver 10 according to the second embodiment performs.

As illustrated in FIG. 7, the channel estimation unit 13 of the receiver 10 obtains the channel estimation values of the OFDM symbols where pilot signals are arranged (step S101) with respect to the signals transmitted by the transmitting antennas and performs linear interpolation in the frequency direction using the obtained channel estimation values (step S102).

The channel estimation unit 13 then performs time-direction interpolation using the channel estimation values of the OFDM symbols containing pilot signals so as to obtain the channel estimation values of OFDM symbols other than the OFDM symbols containing pilot signals (step S103). The de-precoding unit 15 then de-precodes the OFDM symbols whose channel estimation value has been obtained so as to obtain effective channel estimation values (step S104).

The second time-direction interpolation unit 16 then performs time-direction interpolation using the calculated effective channel estimation values (step S105). The demodulator 17 then performs demodulation using the effective channel estimation values (step S106). The layer mapping unit 18 then converts the layer-specific log-likelihood ratios into sequences to be inputted to the decoder 19 (step S107). Subsequently, the decoder 19 performs decoding and then correct errors (step S108), completing the process.

As described above, the receiver 10 calculates the channel estimation values of symbols containing pilot signals, from the signals transmitted by the transmitting antennas so that the channel estimation values of symbols in the same positions of the antennas are obtained. The receiver 10 then de-precodes the calculated channel estimation values of each antenna so as to calculate effective channel estimation values. Using the calculated effective channel estimation values, the receiver 10 performs time-direction interpolation to calculate the effective channel estimation values of symbols other than the symbols containing pilot signals. This may reduce the number of symbols to be interpolated in the time direction and the number of symbols to be de-precoded so as to reduce the complexity, resulting in reductions in power consumption to low levels.

Also, according to the second embodiment, the receiver 10 calculates the channel estimation values of the symbols containing pilot signals from the signals transmitted by the antennas. Then, in the signal transmitted by each antenna, the receiver 10 linearly interpolates the channel estimation values of symbols corresponding to the positions of the symbols containing pilot signals from the signals transmitted by the other antennas so that the channel estimation values of the symbols in the same positions among the antennas are obtained. This may reduce the number of symbols to be interpolated in the time direction and the number of symbols to be de-precoded so as to reduce the complexity, resulting in reductions in power consumption to low levels.

In the second embodiment, the case has been described where, in the signal transmitted by each transmitting antenna, the channel estimation values of symbols where pilots are arranged in the other transmitting antennas are obtained; the channel estimation values of the same symbols among the transmitting antennas are obtained; and then de-precoding is performed. However, this embodiment is not limited thereto. It is also possible to obtain the channel estimation values of symbols corresponding to the positions of symbols containing pilot signals from the signal transmitted by one of the multiple transmitting antennas and then to perform de-precoding.

Hereafter, the process that a receiver according to the third embodiment performs will be described with reference to FIG. 8, where the channel estimation values of symbols where pilots are arranged, of one of the signals transmitted by the transmitting antennas are obtained and then de-precoding is performed. The configuration of the receiver is the same as that of the receiver according to the second embodiment and will not be described.

Figure 8:
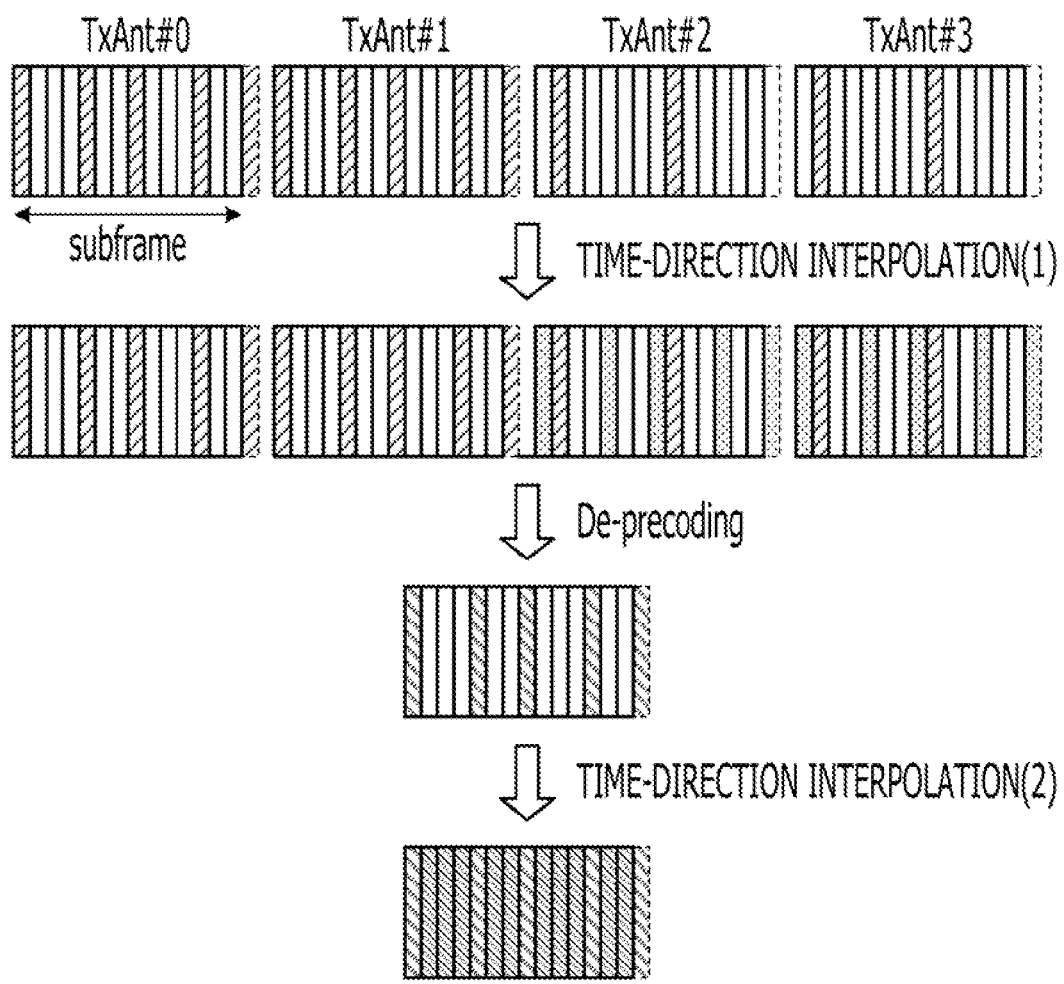
FIG. 8 is a drawing illustrating time-direction interpolation and de-precoding.

FIG. 8 is a drawing illustrating time-direction interpolation and de-precoding. In an example illustrated in FIG. 8, as for the signals transmitted by the transmitting antennas having the transmitting antenna numbers 0 and 1 (TxAnt#0, 1 in FIG. 8) of the above-mentioned transmitting antennas, pilot signals are arranged in the symbols having the symbol numbers 0, 4, 7, and 11. As for signals transmitted by the transmitting antennas having the transmitting antenna numbers 2 and 3 (TxAnt#2, 3 in FIG. 8), pilot signals are arranged in the symbols having the symbol numbers 1 and 8.

As illustrated in FIG. 8, with respect to the signals transmitted by the transmitting antennas having the transmitting antenna numbers 0 and 1, the receiver according to the third embodiment obtains the channel estimation values of the OFDM symbols having the symbol numbers 0, 4, 7, and 11, as indicated by Formula (18) below.

$$h(a, b, n, t, i) = \begin{cases} h(a, b, n, 0, i) & (b = 0, 1, t = 0) \\ h(a, b, n, 4, i) & (b = 0, 1, t = 4) \\ h(a, b, n, 7, i) & (b = 0, 1, t = 7) \\ h(a, b, n, 11, i) & (b = 0, 1, t = 11) \end{cases} \quad (18)$$

With respect to the signals transmitted by the transmitting antennas having the transmitting antenna numbers 2 and 3, the receiver obtains the channel estimation values of the OFDM symbols having the symbol numbers 1 and 8, as indicated by Formula (19) below. The receiver then performs time-direction interpolation using the channel estimation values of the OFDM symbols having the symbol numbers 1 and 8 so as to obtain the channel estimation values of the OFDM symbols having the symbol numbers 0, 4, 7, and 11, as indicated by Formula (19). Thus, the receiver obtains the channel estimation values of the OFDM symbols having the symbol numbers 0, 4, 7, and 11 with respect to all the transmitting antennas.

$$h(a, b, n, t, i) = \qquad (19)$$

$$\begin{cases} \frac{1}{7}h(a, b, n-1, 8, i) + \frac{6}{7}h(a, b, n, 1, i) & (b = 2, 3, t = 0) \\ h(a, b, n, 1, i) & (b = 2, 3, t = 1) \\ \frac{4}{7}h(a, b, n, 1, i) + \frac{3}{7}h(a, b, n, 8, i) & (b = 2, 3, t = 4) \\ \frac{1}{7}h(a, b, n, 1, i) + \frac{6}{7}h(a, b, n, 8, i) & (b = 2, 3, t = 7) \\ h(a, b, n, 8, i) & (b = 2, 3, t = 8) \\ \frac{4}{7}h(a, b, n, 8, i) + \frac{3}{7}h(a, b, n+1, 1, i) & (b = 2, 3, t = 11) \end{cases}$$

Then, as indicated by Formulas (20) to (23) below, the receiver precodes the calculated channel estimation values of the OFDM symbols having the symbol numbers 0, 4, 7, and 11 so as to calculate the effective channel estimation values of these OFDM symbols.

$$\tilde{h}(a, 0, n, 0, i) = V_0 h(a, 0, n, 0, i) + V_1 h(a, 1, n, 0, i) + \qquad (20)$$
$$V_2\left(\frac{1}{7}h(a, 2, n-1, 8, i) + \frac{6}{7}h(a, 2, n, 1, i)\right) +$$
$$V_3\left(\frac{1}{7}h(a, 3, n-1, 8, i) + \frac{6}{7}h(a, 3, n, 1, i)\right)$$

$$\tilde{h}(a, 0, n, 4, i) = V_0 h(a, 0, n, 4, i) + \qquad (21)$$
$$V_1 h(a, 1, n, 4, i) + V_2\left(\frac{4}{7}h(a, 2, n, 1, i) + \frac{3}{7}h(a, 2, n, 8, i)\right) +$$
$$V_3\left(\frac{4}{7}h(a, 3, n, 1, i) + \frac{3}{7}h(a, 3, n, 8, i)\right)$$

$$\tilde{h}(a, 0, n, 7, i) = V_0 h(a, 0, n, 7, i) + \qquad (22)$$
$$V_1 h(a, 1, n, 7, i) + V_2\left(\frac{1}{7}h(a, 2, n, 1, i) + \frac{6}{7}h(a, 2, n, 8, i)\right) +$$
$$V_3\left(\frac{1}{7}h(a, 3, n, 1, i) + \frac{6}{7}h(a, 3, n, 8, i)\right)$$

$$\tilde{h}(a, 0, n, 11, i) = V_0 h(a, 0, n, 11, i) + V_1 h(a, 1, n, 11, i) + \qquad (23)$$
$$V_2\left(\frac{4}{7}h(a, 2, n, 8, i) + \frac{3}{7}h(a, 2, n+1, 1, i)\right) +$$
$$V_3\left(\frac{4}{7}h(a, 3, n+1, 8, i) + \frac{3}{7}h(a, 3, n+1, 1, i)\right)$$

The receiver then performs time-direction linear interpolation using the effective channel estimation values of the OFDM symbols having the symbol numbers 0, 4, 7, and 11 so as to calculate the effective channel estimation values of the OFDM symbols having the symbol numbers 1, 2, 3, 5, 6, 8, 9, and 10.

In this case, as in the second embodiment, the receiver de-precodes the channel estimation value of the symbol having the symbol number 0 of the subsequent sub-frame using the precoding method applied to the current sub-frame so as to obtain the effective channel estimation values, as indicated by Formula (24) below.

$$\tilde{h}(a, 0, n+1, 0, i) = V_0 h(a, 0, n+1, 0, i) + V_1 h(a, 1, n+1, 0, i) + \qquad (24)$$
$$V_2\left(\frac{1}{7}h(a, 2, n, 8, i) + \frac{6}{7}h(a, 2, n+1, 1, i)\right) +$$
$$V_3\left(\frac{1}{7}h(a, 3, n, 8, i) + \frac{6}{7}h(a, 3, n+1, 1, i)\right)$$

The receiver then calculates the effective channel estimation values of the OFDM symbols having symbol numbers 1, 2, 3, 5, 6, 8, 9, and 10 using those of the OFDM symbols having the symbol numbers 0, 4, 7, and 11, as indicated by Formulas (25) to (32) below.

$$\tilde{h}(a, 0, n, 1, i) = \frac{3}{4}\tilde{h}(a, 0, n, 0, i) + \frac{1}{4}\tilde{h}(a, 0, n, 4, i) \qquad (25)$$

$$= \frac{3}{4}\begin{pmatrix} V_0 h(a, 0, n, 0, i) + V_1 h(a, 1, n, 0, i) + \\ V_2\left(\frac{1}{7}h(a, 2, n-1, 8, i) + \frac{6}{7}h(a, 2, n, 1, i)\right) + \\ V_3\left(\frac{1}{7}h(a, 3, n-1, 8, i) + \frac{6}{7}h(a, 3, n, 1, i)\right) \end{pmatrix} +$$

$$\frac{1}{4}\begin{pmatrix} V_0 h(a, 0, n, 4, i) + V_1 h(a, 1, n, 4, i) + \\ V_2\left(\frac{4}{7}h(a, 2, n, 1, i) + \frac{3}{7}h(a, 2, n, 8, i)\right) + \\ V_3\left(\frac{4}{7}h(a, 3, n, 1, i) + \frac{3}{7}h(a, 3, n, 8, i)\right) \end{pmatrix}$$

$$= V_0\left(\frac{3}{4}h(a, 0, n, 0, i) + \frac{1}{4}h(a, 0, n, 4, i)\right) +$$
$$V_1\left(\frac{3}{4}h(a, 1, n, 0, i) + \frac{1}{4}h(a, 1, n, 4, i)\right) +$$
$$V_2\begin{pmatrix} \frac{3}{28}h(a, 2, n-1, 8, i) + \frac{11}{14}h(a, 2, n, 1, i) + \\ \frac{3}{28}h(a, 2, n, 8, i) \end{pmatrix} +$$
$$V_3\begin{pmatrix} \frac{3}{28}h(a, 3, n-1, 8, i) + \frac{11}{14}h(a, 3, n, 1, i) + \\ \frac{3}{28}h(a, 3, n, 8, i) \end{pmatrix}$$

-continued $$\tilde{h}(a, 0, n, 2, i) = \frac{1}{2}\tilde{h}(a, 0, n, 0, i) + \frac{1}{2}\tilde{h}(a, 0, n, 4, i) \quad (26)$$

$$= V_0\left(\frac{1}{2}h(a, 0, n, 0, i) + \frac{1}{2}h(a, 0, n, 4, i)\right) +$$

$$V_1\left(\frac{1}{2}h(a, 1, n, 0, i) + \frac{1}{2}h(a, 1, n, 4, i)\right) +$$

$$V_2\left(\begin{array}{c}\frac{1}{14}h(a, 2, n-1, 8, i) + \frac{5}{7}h(a, 2, n, 1, i) + \\ \frac{3}{14}h(a, 2, n, 8, i)\end{array}\right) +$$

$$V_3\left(\begin{array}{c}\frac{1}{14}h(a, 3, n-1, 8, i) + \frac{5}{7}h(a, 3, n, 1, i) + \\ \frac{3}{14}h(a, 3, n, 8, i)\end{array}\right)$$

$$\tilde{h}(a, 0, n, 3, i) = \frac{1}{4}\tilde{h}(a, 0, n, 0, i) + \frac{3}{4}\tilde{h}(a, 0, n, 4, i) \quad (27)$$

$$= V_0\left(\frac{1}{4}h(a, 0, n, 0, i) + \frac{3}{4}h(a, 0, n, 4, i)\right) +$$

$$V_1\left(\frac{1}{4}h(a, 1, n, 0, i) + \frac{3}{4}h(a, 1, n, 4, i)\right) +$$

$$V_2\left(\begin{array}{c}\frac{1}{28}h(a, 2, n-1, 8, i) + \frac{9}{14}h(a, 2, n, 1, i) + \\ \frac{9}{28}h(a, 2, n, 8, i)\end{array}\right) +$$

$$V_3\left(\begin{array}{c}\frac{1}{28}h(a, 3, n-1, 8, i) + \frac{9}{14}h(a, 3, n, 1, i) + \\ \frac{9}{28}h(a, 3, n, 8, i)\end{array}\right)$$

$$\tilde{h}(a, 0, n, 5, i) = \frac{2}{3}\tilde{h}(a, 0, n, 4, i) + \frac{1}{3}\tilde{h}(a, 0, n, 7, i) \quad (28)$$

$$= \frac{2}{3}\left(\begin{array}{c}V_0 h(a, 0, n, 4, i) + V_1 h(a, 1, n, 4, i) + \\ V_2\left(\frac{4}{7}h(a, 2, n, 1, i) + \frac{3}{7}h(a, 2, n, 8, i)\right) + \\ V_3\left(\frac{4}{7}h(a, 3, n, 1, i) + \frac{3}{7}h(a, 3, n, 8, i)\right)\end{array}\right) +$$

$$\frac{1}{3}\left(\begin{array}{c}V_0 h(a, 0, n, 7, i) + V_1 h(a, 1, n, 7, i) - \\ V_2\left(\frac{1}{7}h(a, 2, n, 1, i) + \frac{6}{7}h(a, 2, n, 8, i)\right) + \\ V_3\left(\frac{1}{7}h(a, 3, n, 1, i) + \frac{6}{7}h(a, 3, n, 8, i)\right)\end{array}\right)$$

$$= V_0\left(\frac{2}{3}h(a, 0, n, 4, i) + \frac{1}{3}h(a, 0, n, 7, i)\right) +$$

$$V_1\left(\frac{2}{3}h(a, 1, n, 4, i) + \frac{1}{3}h(a, 1, n, 7, i)\right) +$$

$$V_2\left(\frac{3}{7}h(a, 2, n, 1, i) + \frac{4}{7}h(a, 2, n, 8, i)\right) +$$

$$V_3\left(\frac{3}{7}h(a, 3, n, 1, i) + \frac{4}{7}h(a, 3, n, 8, i)\right)$$

$$\tilde{h}(a, 0, n, 6, i) = \frac{1}{3}\tilde{h}(a, 0, n, 4, i) + \frac{2}{3}\tilde{h}(a, 0, n, 7, i) \quad (29)$$

$$= V_0\left(\frac{1}{3}h(a, 0, n, 4, i) + \frac{2}{3}h(a, 0, n, 7, i)\right) +$$

$$V_1\left(\frac{1}{3}h(a, 1, n, 4, i) + \frac{2}{3}h(a, 1, n, 7, i)\right) +$$

$$V_2\left(\frac{2}{7}h(a, 2, n, 1, i) + \frac{5}{7}h(a, 2, n, 8, i)\right) +$$

$$V_3\left(\frac{2}{7}h(a, 3, n, 1, i) + \frac{5}{7}h(a, 3, n, 8, i)\right)$$

$$\tilde{h}(a, 0, n, 8, i) = \frac{3}{4}\tilde{h}(a, 0, n, 7, i) + \frac{1}{4}\tilde{h}(a, 0, n, 11, i) \quad (30)$$

$$= \frac{3}{4}\left(\begin{array}{c}V_0 h(a, 0, n, 7, i) + V_1 h(a, 1, n, 7, i) + \\ V_2\left(\frac{1}{7}h(a, 2, n, 1, i) + \frac{6}{7}h(a, 2, n, 8, i)\right) + \\ V_3\left(\frac{1}{7}h(a, 3, n, 1, i) + \frac{6}{7}h(a, 3, n, 8, i)\right)\end{array}\right) +$$

$$\frac{1}{4}\left(\begin{array}{c}V_0 h(a, 0, n, 11, i) + V_1 h(a, 1, n, 11, i) + \\ V_2\left(\frac{4}{7}h(a, 2, n, 8, i) + \frac{3}{7}h(a, 2, n+1, 1, i)\right) + \\ V_3\left(\frac{4}{7}h(a, 3, n, 8, i) + \frac{3}{7}h(a, 3, n+1, 1, i)\right)\end{array}\right)$$

$$= V_0\left(\frac{3}{4}h(a, 0, n, 7, i) + \frac{1}{4}h(a, 0, n, 11, i)\right) +$$

$$V_1\left(\frac{3}{4}h(a, 1, n, 7, i) + \frac{1}{4}h(a, 1, n, 11, i)\right) +$$

$$V_2\left(\begin{array}{c}\frac{3}{28}h(a, 2, n, 1, i) + \frac{11}{14}h(a, 2, n, 8, i) + \\ \frac{3}{28}h(a, 2, n+1, 1, i)\end{array}\right) +$$

$$V_3\left(\begin{array}{c}\frac{3}{28}h(a, 3, n, 1, i) + \frac{11}{14}h(a, 3, n, 8, i) + \\ \frac{3}{28}h(a, 3, n+1, 1, i)\end{array}\right)$$

$$\tilde{h}(a, 0, n, 9, i) = \frac{1}{2}\tilde{h}(a, 0, n, 7, i) + \frac{1}{2}\tilde{h}(a, 0, n, 11, i) \quad (31)$$

$$= V_0\left(\frac{1}{2}h(a, 0, n, 7, i) + \frac{1}{2}h(a, 0, n, 11, i)\right) +$$

$$V_1\left(\frac{1}{2}h(a, 1, n, 7, i) + \frac{1}{2}h(a, 1, n, 11, i)\right) +$$

$$V_2\left(\begin{array}{c}\frac{1}{14}h(a, 2, n, 1, i) + \frac{5}{7}h(a, 2, n, 8, i) + \\ \frac{3}{14}h(a, 2, n+1, 1, i)\end{array}\right) +$$

$$V_3\left(\begin{array}{c}\frac{1}{14}h(a, 3, n, 1, i) + \frac{5}{7}h(a, 3, n, 8, i) + \\ \frac{3}{14}h(a, 3, n+1, 1, i)\end{array}\right)$$

$$\tilde{h}(a, 0, n, 10, i) = \frac{1}{4}\tilde{h}(a, 0, n, 7, i) + \frac{3}{4}\tilde{h}(a, 0, n, 11, i) \quad (32)$$

$$= V_0\left(\frac{1}{4}h(a, 0, n, 7, i) + \frac{3}{4}h(a, 0, n, 11, i)\right) +$$

$$V_1\left(\frac{1}{4}h(a, 1, n, 7, i) + \frac{3}{4}h(a, 1, n, 11, i)\right) +$$

$$V_2\left(\begin{array}{c}\frac{1}{28}h(a, 2, n, 1, i) + \frac{9}{14}h(a, 2, n, 8, i) + \\ \frac{9}{28}h(a, 2, n+1, 1, i)\end{array}\right) +$$

$$V_3\left(\begin{array}{c}\frac{1}{28}h(a, 3, n, 1, i) + \frac{9}{14}h(a, 3, n, 8, i) + \\ \frac{9}{28}h(a, 3, n+1, 1, i)\end{array}\right)$$

The receiver then calculates the effective channel estimation values of the OFDM symbols having the symbol numbers 12 and 13 using that of the OFDM symbol having the symbol number 11, as indicated by Formulas (33) to (34) below. The receiver then performs demodulation and decoding.

$$\tilde{h}(a, 0, n, 12, i) = \frac{2}{3}\tilde{h}(a, 0, n, 11, i) + \frac{1}{3}\tilde{h}(a, 0, n+1, 0, i) \quad (33)$$

$$= \frac{2}{3}\begin{pmatrix} V_0 h(a, 7, n, 4, i) + V_1 h(a, 1, n, 11, i) + \\ V_2\left(\frac{4}{7}h(a, 2, n, 8, i) + \frac{3}{7}h(a, 2, n+1, 1, i)\right) + \\ V_3\left(\frac{4}{7}h(a, 3, n, 8, i) + \frac{3}{7}h(a, 3, n+1, 1, i)\right) \end{pmatrix} +$$

$$\frac{1}{3}\begin{pmatrix} V_0 h(a, 0, n, 4, i) + V_1 h(a, 1, n, 11, i) + \\ V_2\left(\frac{1}{7}h(a, 2, n, 8, i) + \frac{6}{7}h(a, 2, n+1, 1, i)\right) + \\ V_3\left(\frac{1}{7}h(a, 3, n, 8, i) + \frac{6}{7}h(a, 3, n+1, 1, i)\right) \end{pmatrix}$$

$$= V_0\left(\frac{2}{3}h(a, 0, n, 11, i) + \frac{1}{3}h(a, 0, n+1, 0, i)\right) +$$

$$V_1\left(\frac{2}{3}h(a, 1, n, 11, i) + \frac{1}{3}h(a, 1, n+1, 0, i)\right) +$$

$$V_2\left(\frac{3}{7}h(a, 2, n, 8, i) + \frac{4}{7}h(a, 2, n+1, 1, i)\right) +$$

$$V_3\left(\frac{3}{7}h(a, 3, n, 8, i) + \frac{4}{7}h(a, 3, n+1, 1, i)\right)$$

$$\tilde{h}(a, 0, n, 13, i) = \frac{1}{3}\tilde{h}(a, 0, n, 11, i) + \frac{2}{3}\tilde{h}(a, 0, n+1, 0, i) \quad (34)$$

$$= V_0\left(\frac{1}{3}h(a, 0, n, 11, i) + \frac{2}{3}h(a, 0, n+1, 0, i)\right) +$$

$$V_1\left(\frac{1}{3}h(a, 1, n, 11, i) + \frac{2}{3}h(a, 1, n+1, 0, i)\right) +$$

$$V_2\left(\frac{2}{7}h(a, 2, n, 8, i) + \frac{5}{7}h(a, 2, n+1, 1, i)\right) +$$

$$V_3\left(\frac{2}{7}h(a, 3, n, 8, i) + \frac{5}{7}h(a, 3, n+1, 1, i)\right)$$

As seen, in the third embodiment, the channel estimation values of the symbols containing pilot signals from the signals transmitted by the antennas are calculated. Then, the channel estimation values of symbols corresponding to the positions of the symbols containing pilot signals from the signal transmitted by one of the antennas are linearly interpolated. This can further reduce the number of symbols to be interpolated in the time direction and the number of symbols to be de-precoded so as to further reduce the complexity, resulting in reductions in power consumption to lower levels.

While the first to third embodiments have been described, the present invention may be carried out as various embodiments other than these embodiments. Hereafter, another embodiment included in the present invention as a fourth embodiment will be described.

In the above-mentioned third embodiment, the case has been described where the channel estimation values of symbols corresponding to the positions of the symbols containing pilot signals from the signal transmitted by one of the antennas are obtained so that the channel estimation values having the same symbol numbers of the antennas are obtained. However, the present invention is not limited thereto. One of the multiple antennas may be selected according to the arrangement intervals of pilot signals in the signals transmitted by the antennas, and the positions of symbols to be de-precoded of each antenna may be matched with the positions of the symbols containing pilot signals, of the selected antenna.

For example, in a case where the receiver selects an antenna where pilot signals are arranged at large intervals and the positions of symbols to be de-precoded are matched with one another among the antennas, the complexity may be further reduced. In contrast, in a case where the receiver selects an antenna where pilot signals are arranged at small intervals and the positions of symbols to be de-precoded are matched with one another among the antennas, the complexity may be reduced with channel estimation accuracy maintained.

Figure 9:
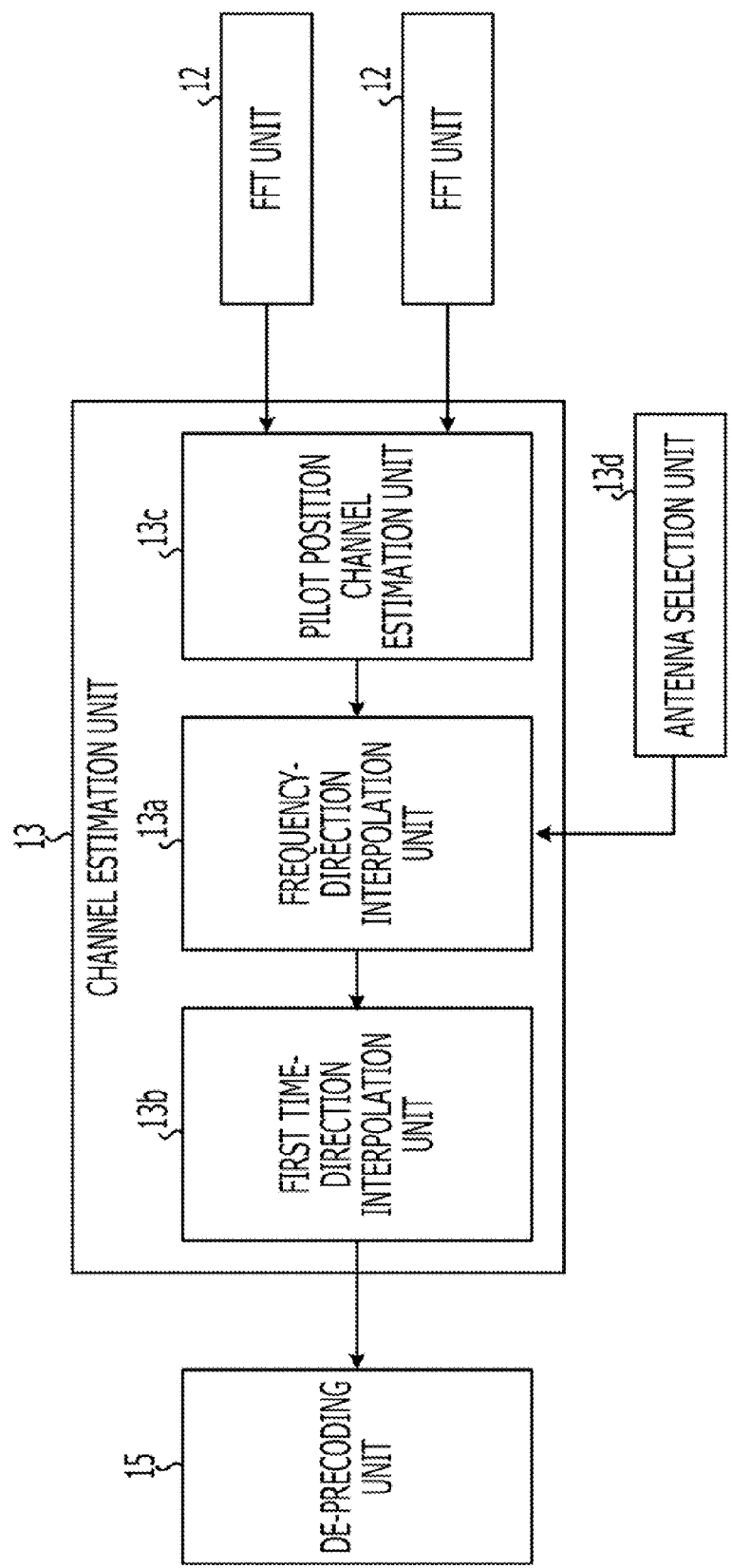
FIG. 9 is a block diagram illustrating the detailed configuration of the receiver.

Referring now to FIG. 9, the detailed configuration of the receiver will be described. FIG. 9 is a block diagram illustrating the detailed configuration of the receiver. As illustrated in FIG. 9, the receiver differs from that illustrated in FIG. 5 in that it additionally includes an antenna selection unit 13*d*. The antenna selection unit 13*d* selects one of the multiple antennas depending on the arrangement intervals of pilot signals in the signals transmitted by the antennas and notifies the first time-direction interpolation unit 13*b* of the selected antenna.

The first time-direction interpolation unit 13*b* then linearly interpolates the channel estimation values of symbols corresponding to the positions of the symbols containing pilot signals from the signal transmitted by the antenna selected by the antenna selection unit 13*d*.

Alternatively, one of the multiple antennas may be selected depending on the magnitude of time-direction variation in channel estimation value between each transmitting antenna and each receiving antenna, and the channel estimation values of symbols corresponding to the positions of the symbols containing pilot signals, of the selected antenna may be obtained.

For example, in a case where the channel estimation value varies to a small extent in the time direction, the receiver selects an antenna whose pilot signals are arranged at large intervals, and the positions of symbols to be de-precoded, of the antennas are matched with those of the selected antenna. In this case, the complexity can be further reduced. In contrast, in a case where the channel estimation value varies to a large extent in the time direction, the receiver selects an antenna whose pilot signals are arranged at small intervals, and the positions of symbols to be de-precoded, of the antennas are matched with those of the selected antenna. In this case, even when the transmitted signal varies to a large extent in the time direction, it is possible to reduce the complexity while maintaining channel estimation accuracy.

Also, in a case where the receiver according to the present invention is mounted on a mobile station, the velocity of the mobile station may be detected and used as a standard for selecting an antenna according to which the channel estimation values are obtained. For example, in a case where the velocity is low, the receiver selects an antenna whose pilot signals are arranged at large intervals, and the positions of symbols to be de-precoded, of the antennas are matched with those of the selected antenna. In this case, the complexity can be further reduced. In contrast, in a case where the velocity is high, the receiver selects an antenna whose pilot signals are arranged at small intervals, and the positions of symbols to be de-precoded, of the antennas are matched with those of the selected antenna. In this case, even when the transmitted signal varies to a large extent in the time direction, it is possible to reduce the complexity while maintaining channel estimation and de-precoding accuracies.

The illustrated components of each apparatus do not necessarily need to be configured physically as illustrated. That is, the specific form of the distribution or consolidation of the components of each apparatus is not limited to what are illustrated, and all or part of the components may be functionally or physically distributed or consolidated in any unit depending on the loads imposed thereon or the use state thereof. For example, the channel estimation unit 13 and de-precoding unit 15 may be consolidated.

The channel estimation methods described in the above-mentioned embodiments may be realized by execution of a previously prepared program by a computer such as a personal computer or workstation. This program may be distributed via a network such as the Internet. This program can also be executed by recording it on a computer-readable recording medium such as a hard disk, flexible disk (FD), CD-ROM, magneto-optical (MO) disc, flash memory, and DVD and reading it from the recording medium using a computer.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A receiver comprising:
   a channel estimation unit that calculates channel estimation values of symbols containing pilot signals from signals transmitted by a plurality of antennas to obtain channel estimation values of symbols in the same positions of the antennas;
   a de-precoding unit that de-precodes the channel estimation values of the antennas calculated by the channel estimation unit to calculate effective channel estimation values; and
   a time-direction interpolation unit that performs time-direction interpolation using the effective channel estimation values calculated by the de-precoding unit to calculate effective channel estimation values of symbols other than the symbols containing pilot signals.

2. The receiver according to claim 1, wherein
   the channel estimation unit calculates channel estimation values of symbols containing pilot signals from the signals transmitted by the antennas as well as, in the signal transmitted by each antenna, linearly interpolates channel estimation values of symbols corresponding to positions of symbols containing pilot signals from the signals transmitted by the other antennas to obtain channel estimation values of symbols in the same positions of the antennas.

3. The receiver according to claim 1, wherein
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by one of the antennas to obtain channel estimation values in the same positions of the antennas.

4. The receiver according to claim 2, wherein
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by one of the antennas to obtain channel estimation values in the same positions of the antennas.

5. The receiver according to claim 3, wherein
   the channel estimation unit includes an antenna selection unit that selects one of the antennas depending on arrangement intervals of pilot signals in the signals transmitted by the antennas, and
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

6. The receiver according to claim 4, wherein
   the channel estimation unit includes an antenna selection unit that selects one of the antennas depending on arrangement intervals of pilot signals in the signals transmitted by the antennas, and
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

7. The receiver according to claim 1, wherein
   the channel estimation unit includes an antenna selection unit that selects one of the antennas depending on a magnitude of time-direction variation in channel estimation value between a transmitting antenna and a receiving antenna, and
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

8. The receiver according to claim 2, wherein
   the channel estimation unit includes an antenna selection unit that selects one of the antennas depending on a magnitude of time-direction variation in channel estimation value between a transmitting antenna and a receiving antenna, and
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

9. The receiver according to claim 1, wherein
   the channel estimation unit includes an antenna selection unit that selects one of the antennas depending on a velocity of a receiver, and
   the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

10. The receiver according to claims 2, wherein
    the channel estimation unit includes an antenna selection unit that selects one of the antennas depending on a velocity of a receiver, and
    the channel estimation unit calculates channel estimation values of symbols containing pilot signals from the signals transmitted by the antennas as well as linearly interpolates channel estimation values of symbols corresponding to positions of symbols containing pilot signals from the signal transmitted by the antenna selected by the antenna selection unit.

11. A communication system comprising:
a transmitter provided with a plurality of antennas; and
a receiver, which
includes:
- a channel estimation unit that calculates channel estimation values of symbols containing pilot signals from signals received from the plurality of antennas to obtain channel estimation values of symbols in the same positions of the antennas,
- a de-precoding unit that de-precodes the channel estimation values of the antennas calculated by the channel estimation unit to calculate effective channel estimation values, and
- a time-direction interpolation unit that performs time-direction interpolation using the effective channel estimation values calculated by the de-precoding unit to calculate effective channel estimation values of symbols other than the symbols containing pilot signals.

12. A channel estimation method comprising:
calculating channel estimation values of symbols containing pilot signals, of signals transmitted by a plurality of antennas to obtain channel estimation values of symbols in the same positions of the antennas;
de-precoding the channel estimation values of the antennas calculated by the channel estimation unit to calculate effective channel estimation values; and
performing time-direction interpolation using the calculated effective channel estimation values to calculate effective channel estimation values of symbols other than the symbols containing pilot signals.

13. The receiver according to claim 1, wherein
the effective channel estimation values indicate channel variation between each layer and each receiving antenna.

14. The communication system according to claim 11, wherein
the effective channel estimation values indicate channel variation between each layer and each receiving antenna.

15. The channel estimation method according to claim 12, wherein
the effective channel estimation values indicate channel variation between each layer and each receiving antenna.

* * * * *